O. THIEME.
ADDING AND LISTING MACHINE.
APPLICATION FILED FEB. 7, 1911.
1,249,554.
Patented Dec. 11, 1917.
13 SHEETS—SHEET 13.
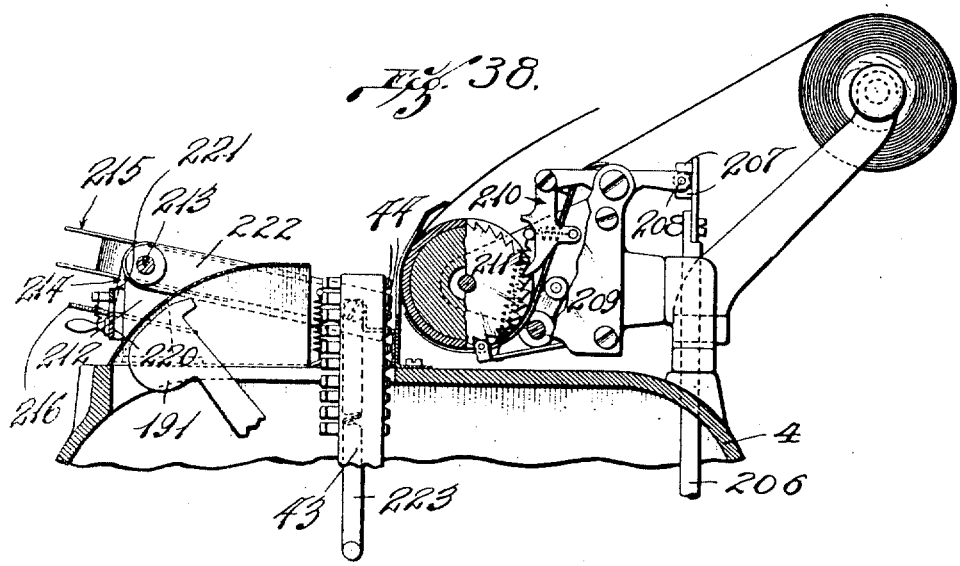
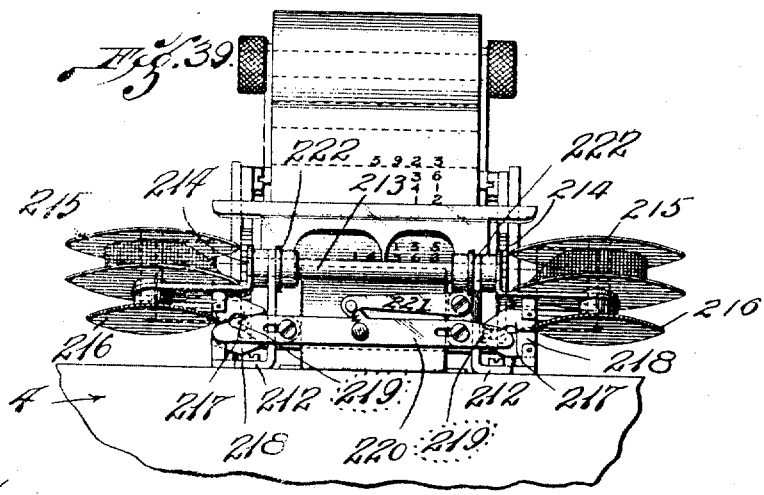

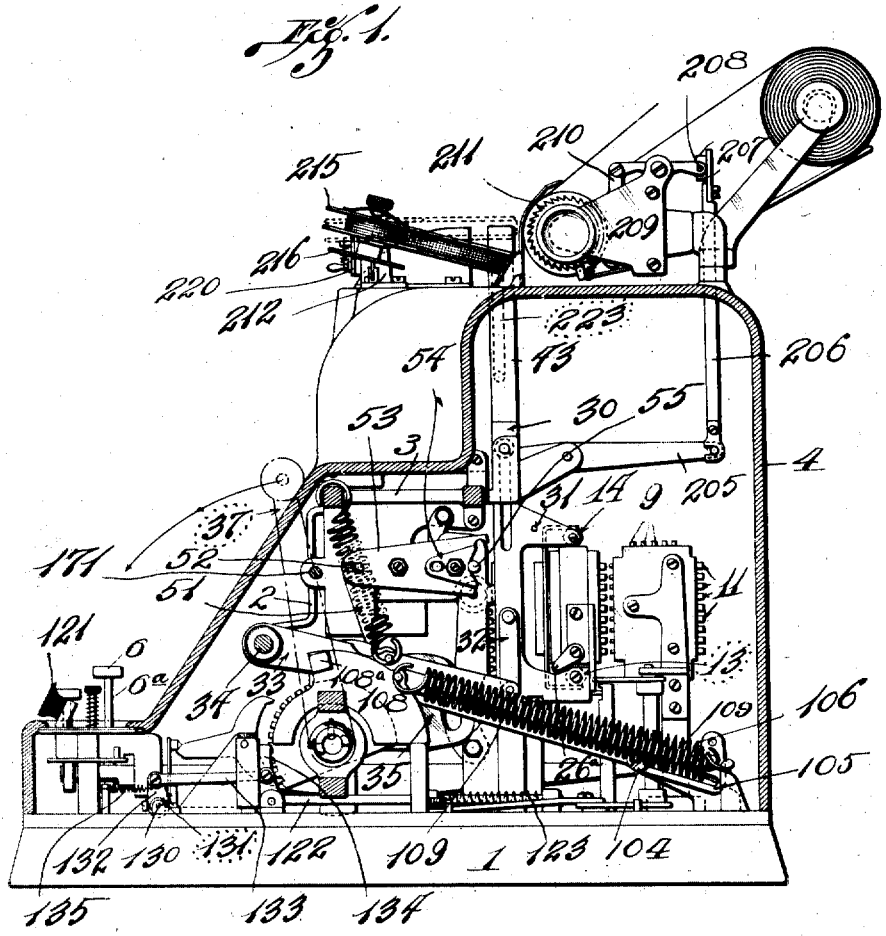

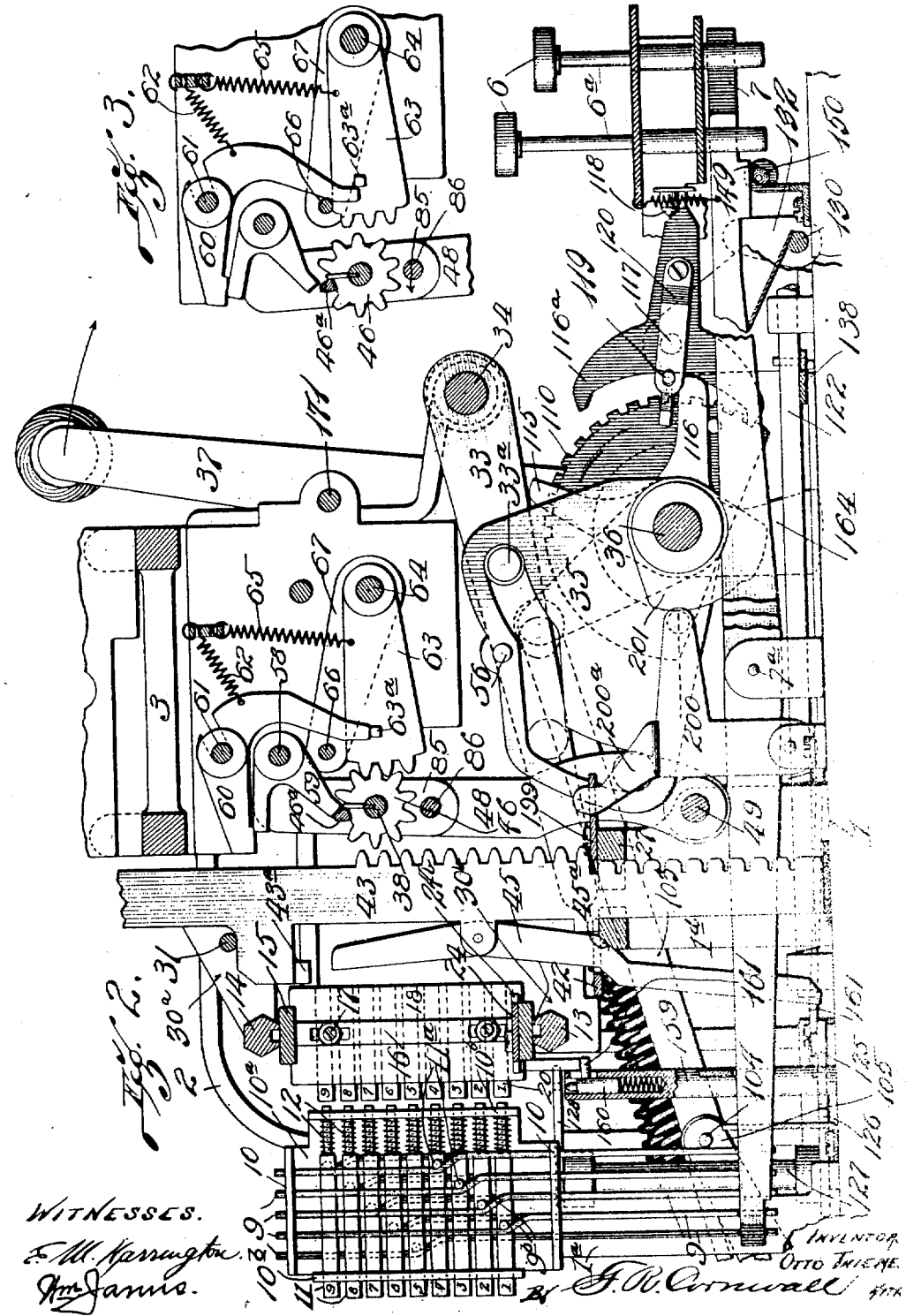

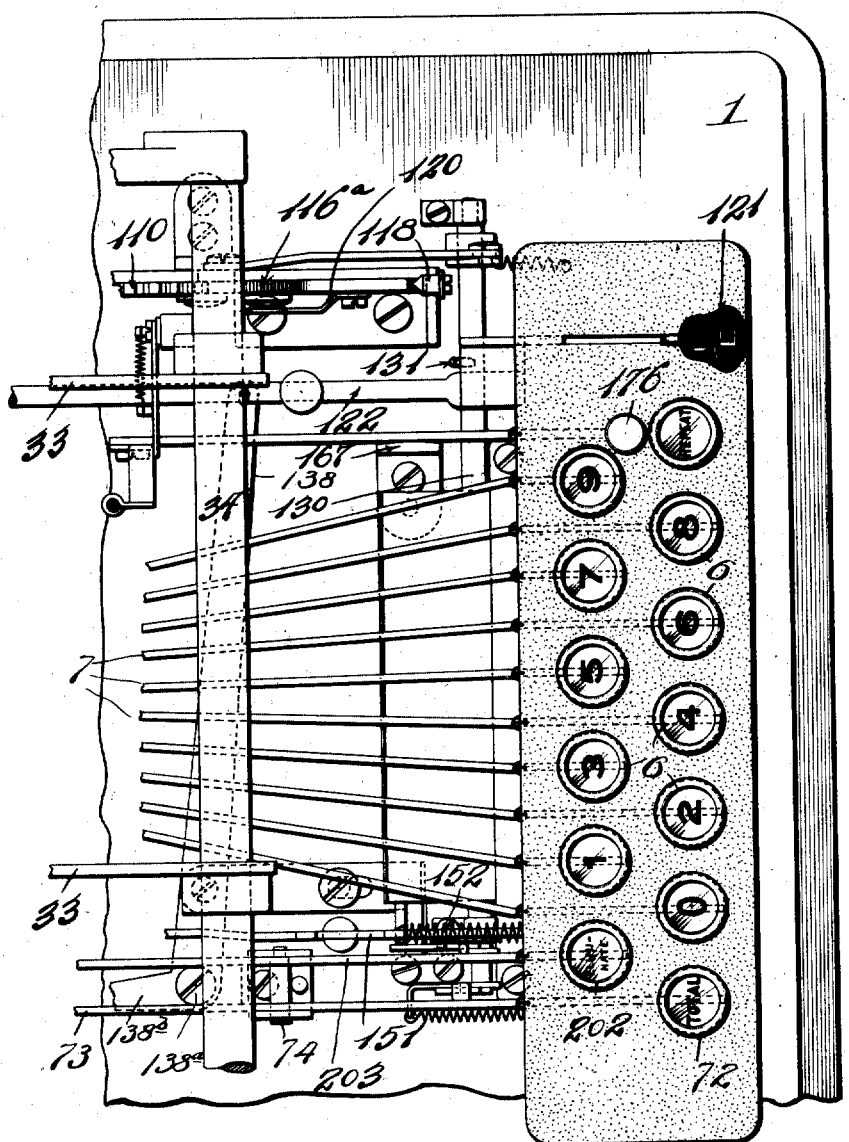

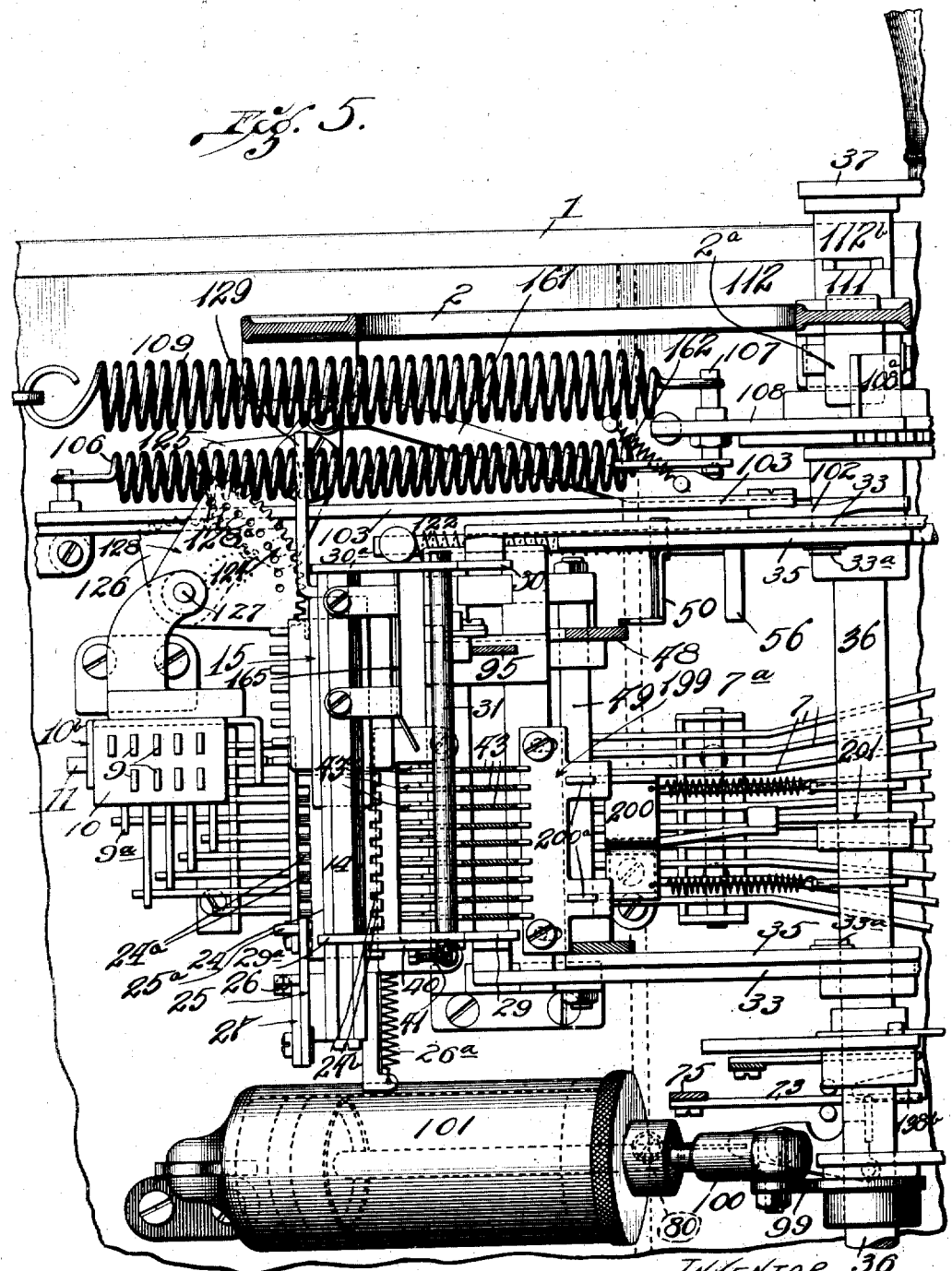

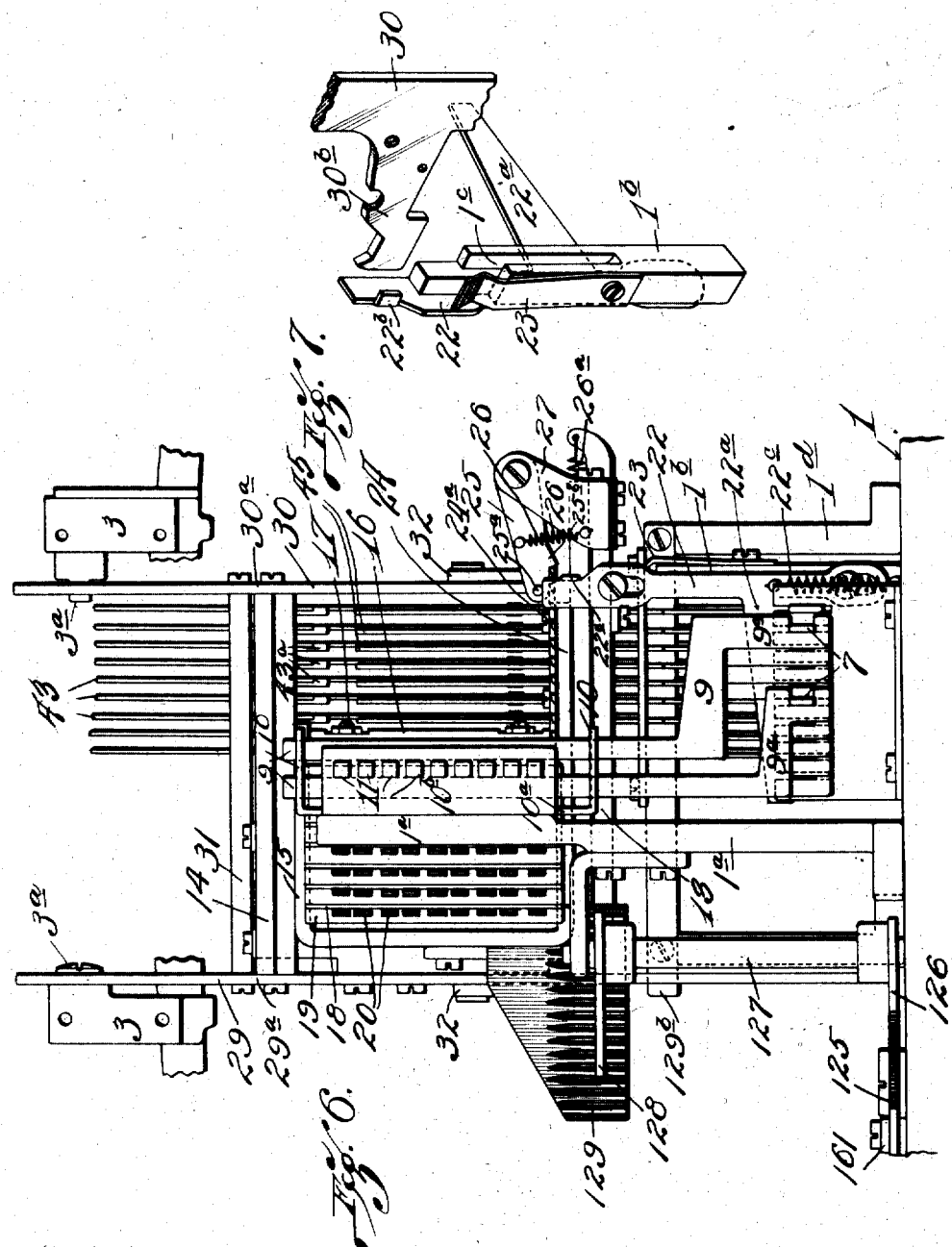

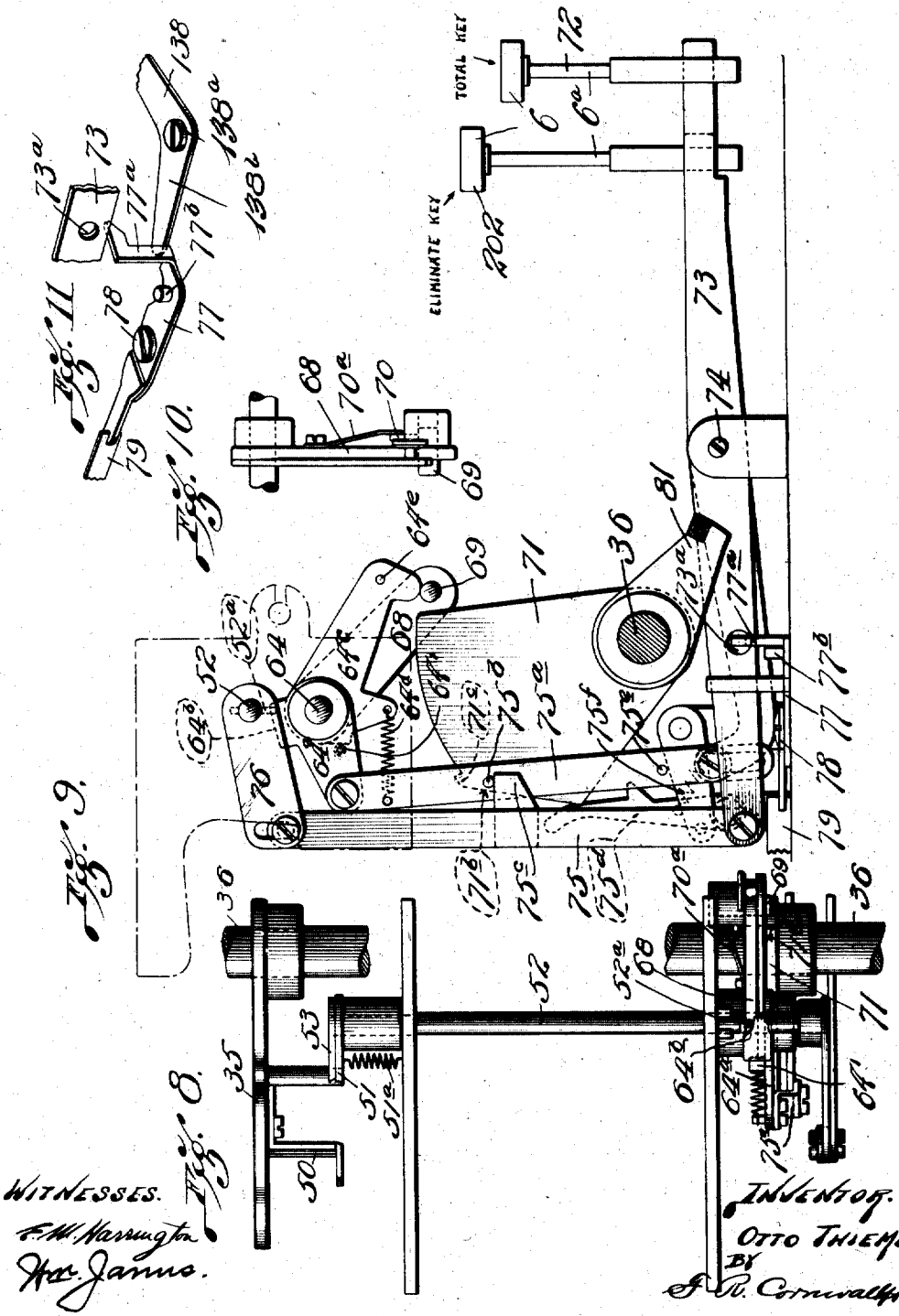

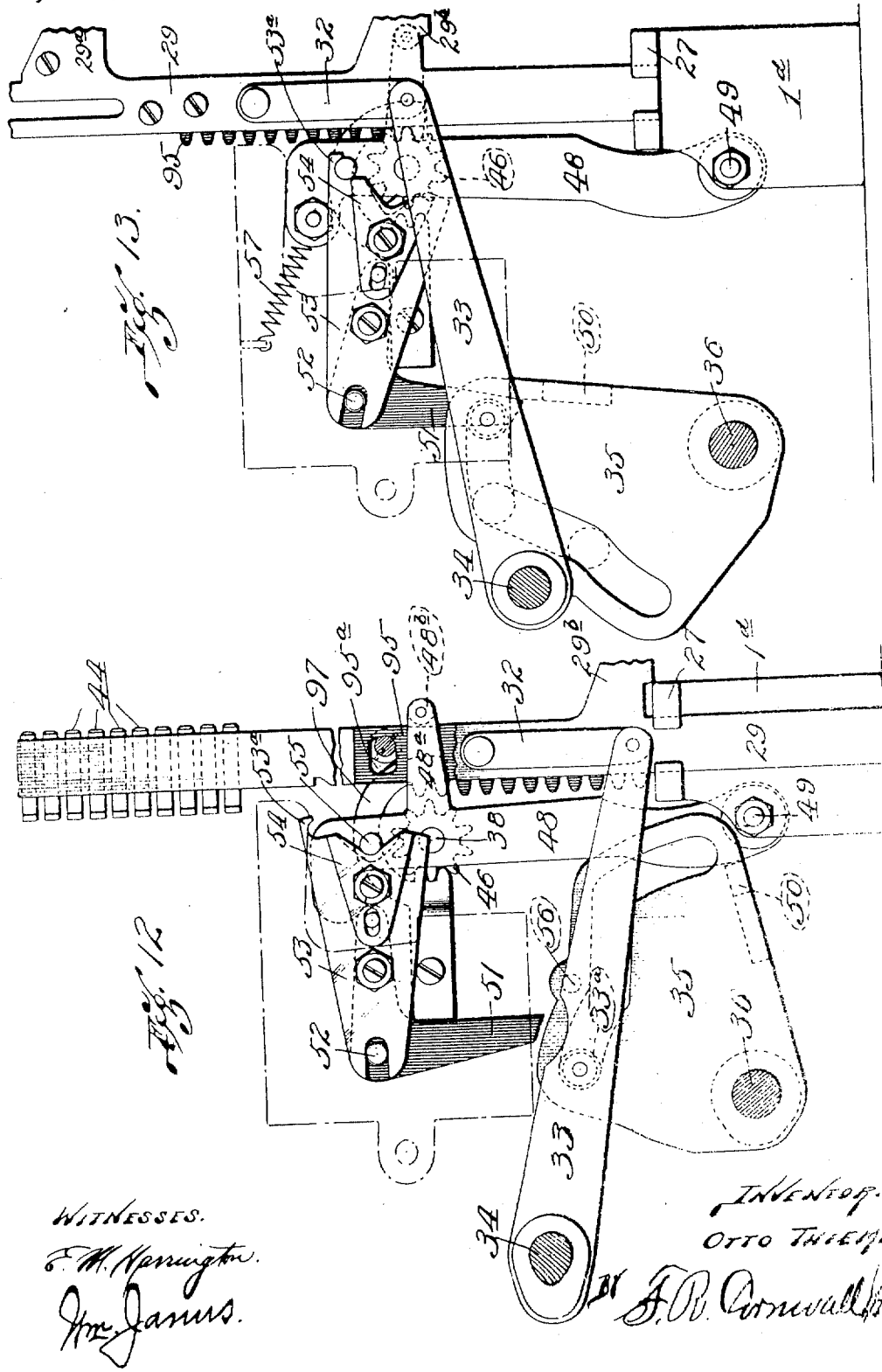

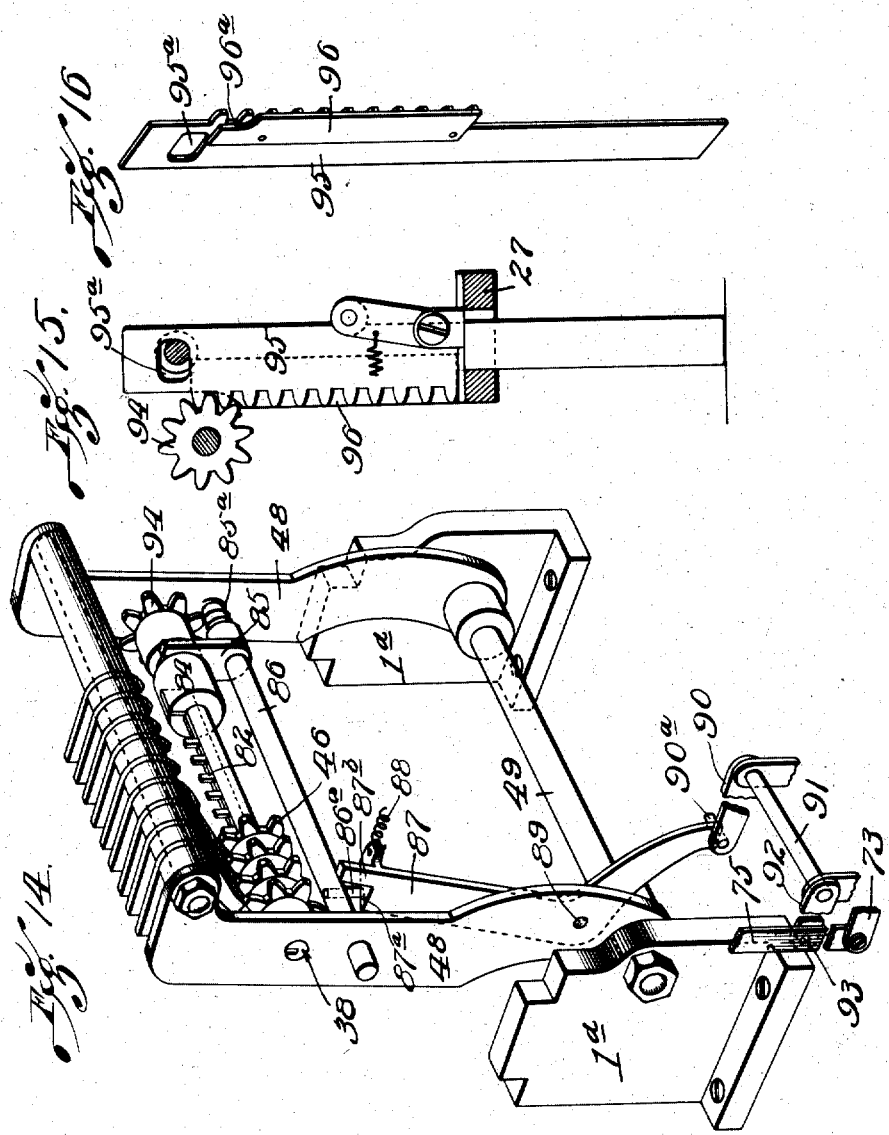

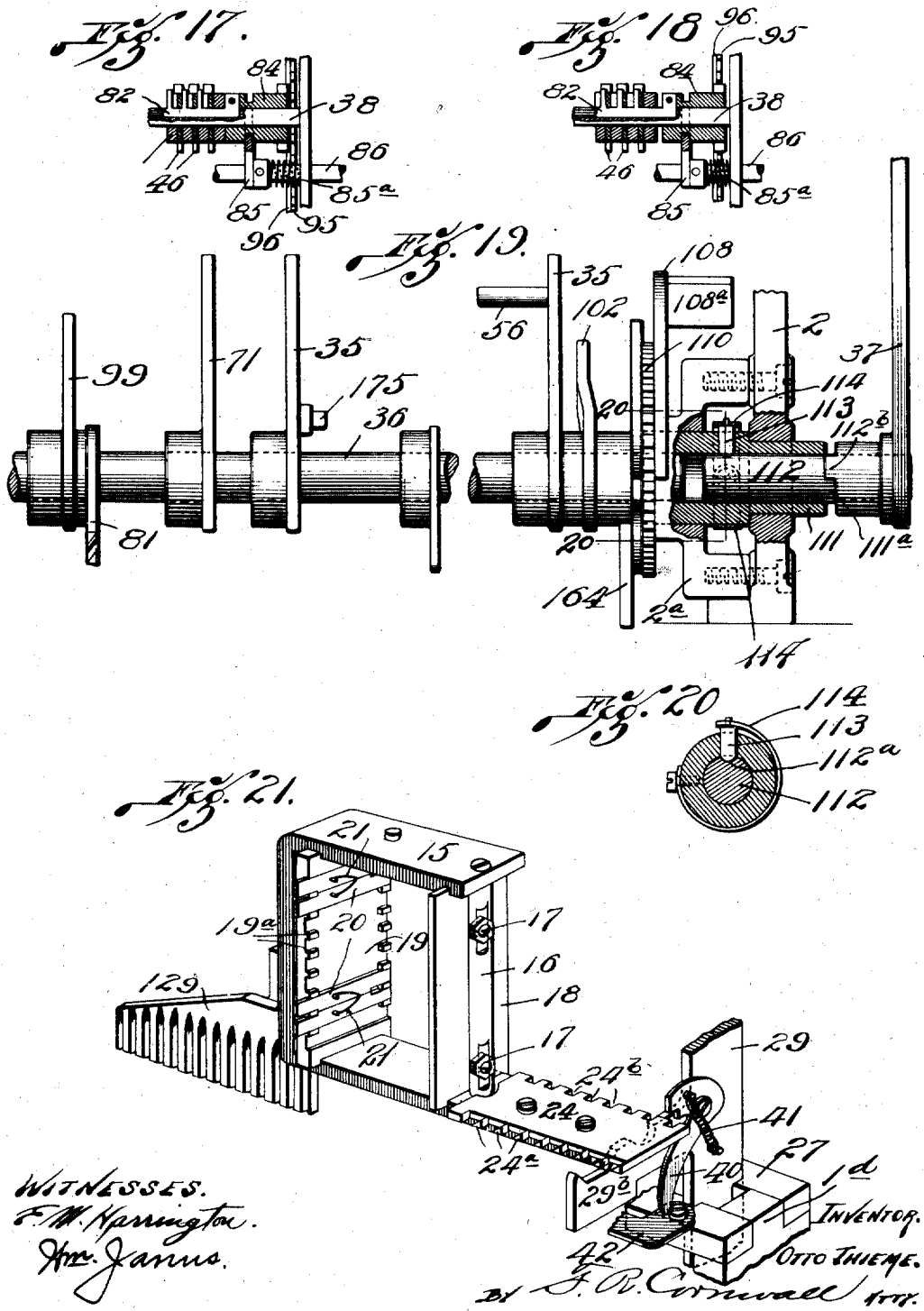

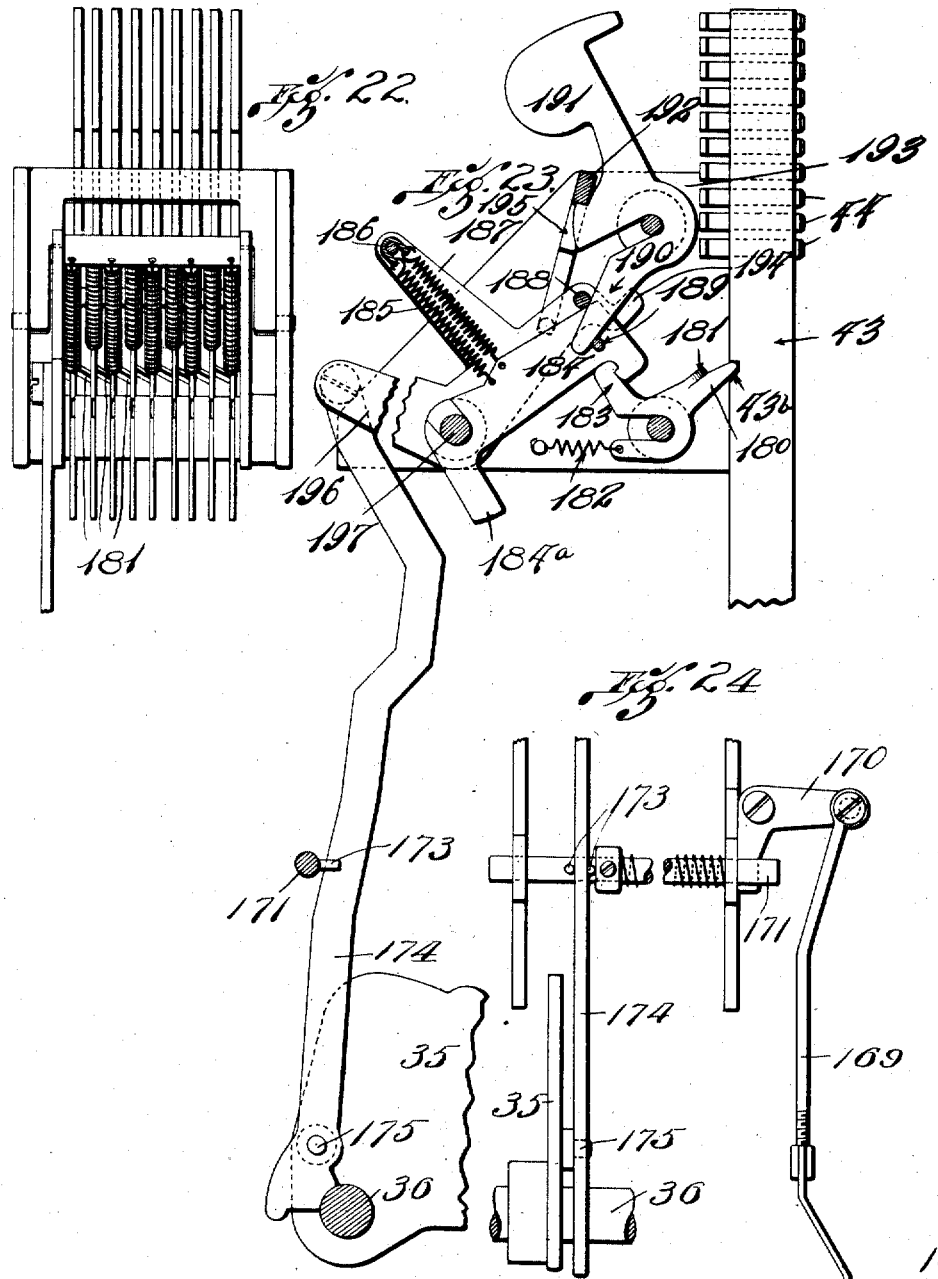

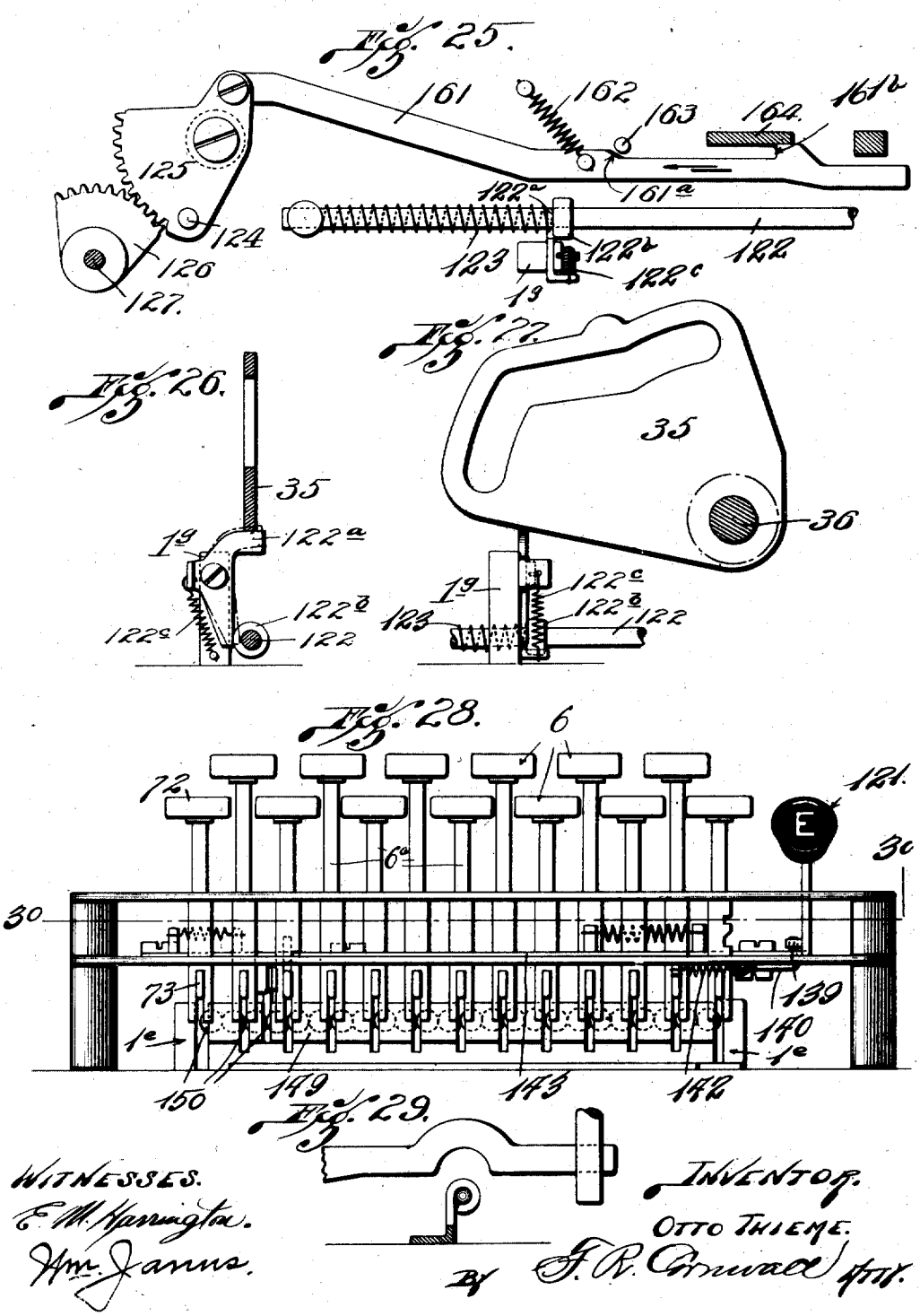

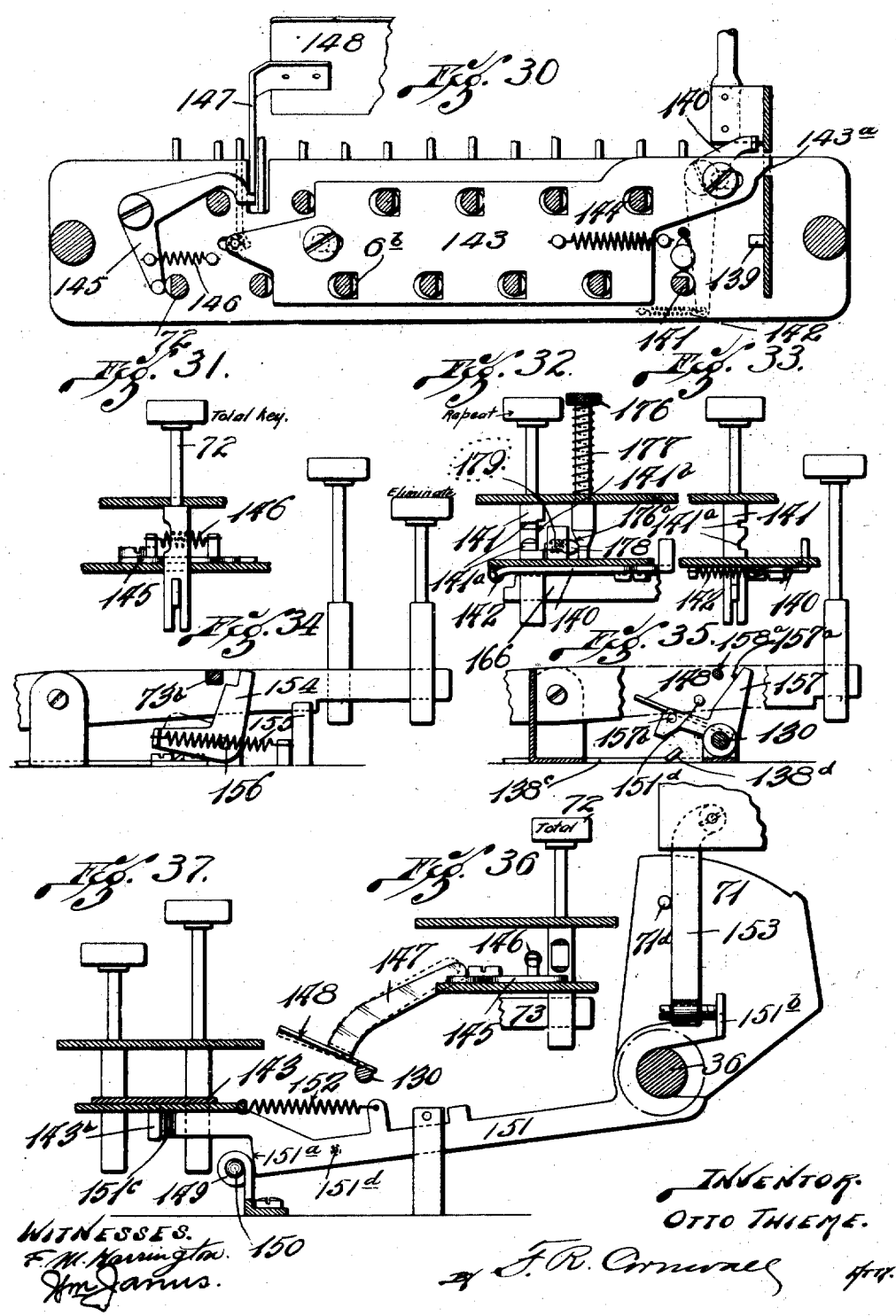

UNITED STATES PATENT OFFICE.

OTTO THIEME, OF ST. LOUIS, MISSOURI, ASSIGNOR TO MOON-HOPKINS BILLING MACHINE COMPANY, OF ST. LOUIS, MISSOURI, A CORPORATION.

ADDING AND LISTING MACHINE.

1,249,554.      Specification of Letters Patent.      Patented Dec. 11, 1917.

Application filed February 7, 1911. Serial No. 607,084.

*To all whom it may concern:*

Be it known that I, OTTO THIEME, a citizen of the United States, residing at St. Louis, Missouri, have invented a certain new and useful Improvement in Adding and Listing Machines, of which the following is a full, clear, and exact description, such as will enable others skilled in the art to which it appertains to make and use the same, reference being had to the accompanying drawings, forming part of this specification, in which—

Figure 1 is a side elevational view of my improved calculating machine, the near side of the casing being removed to show the interior mechanism;

Fig. 2 is a side elevational view of the parts as seen from the left-hand side of the machine;

Fig. 3 is a detail view of the carrying mechanism;

Fig. 4 is a plan view illustrating the front portion of the machine;

Fig. 5 is a similar view illustrating the rear portion of the machine;

Fig. 6 is a rear elevational view of part of the mechanism;

Fig. 7 is a detail view;

Fig. 8 is a plan view of the total and eliminating key-connections;

Fig. 9 is a side elevational view of the total and eliminating keys and their connections;

Fig. 10 is a front view of certain of the parts shown in Fig. 9;

Fig. 11 is a detail view illustrating the latch coöperating with the total key;

Fig. 12 is a side elevational view illustrating the mechanism for operating the lifting frame;

Fig. 13 is a similar view showing the parts in their changed position;

Fig. 14 is a detail view illustrating the details of the totalizer and part of the total-key-connections;

Fig. 15 is a detail view showing the rack for operating the totalizers in the total-taking operations;

Fig. 16 is another view of said rack;

Fig. 17 is a sectional view through the totalizer;

Fig. 18 is a similar view showing the parts in different position;

Fig. 19 is a detail view of the main operating shaft and its carried parts;

Fig. 20 is a cross-sectional view through the same on line 20—20;

Fig. 21 is a detail view of the laterally movable carriage and parts coöperating therewith;

Fig. 22 is a front elevational view of the printing mechanism;

Fig. 23 is a side elevational view of the same;

Fig. 24 is a front elevational view of the lower portion of the mechanism shown in Fig. 23;

Fig. 25 is a plan view of the restoring mechanism for the laterally movable carriage;

Fig. 26 is a front elevational view of the lock for the error key;

Fig. 27 is a side elevational view of the same;

Fig. 28 is a front elevational view of the keys and their connections;

Fig. 29 is a detail side elevational view of the front end of the zero key-bar;

Fig. 30 is a horizontal sectional view on line 30—30, Fig. 28;

Fig. 31 is a side elevation of the total key;

Fig. 32 is a side elevational view of the repeat key;

Fig. 33 is a front elevational view of said repeat key;

Fig. 34 is a side elevational view illustrating the lock for the total key;

Fig. 35 is a side elevational view of the eliminating key and its associate parts;

Fig. 36 is a side elevational view of the total key and the parts controlled thereby;

Fig. 37 is a side elevational view of the means for locking the keys against movement upon the operation of the main shaft;

Fig. 38 is a side elevational view of the paper carriage partly in section;

Fig. 39 is a front elevational view of the ribbon reverse.

This invention relates to a new and useful improvement in adding and listing machines, the object being to construct a machine of the character described in a simple and cheap manner, the several parts thereof being so combined and arranged that the action of the machine is positive and therefore not liable to get out of order because of under or over throw of the several parts. There are various novel features of construction, such as the manner of setting up the lifting bars which control the actuators from the keys; the manner of introducing items into the totalizers; the manner of taking a total of the items; the manner of multiplying numbers; the manner of eliminating printing; the manner of correcting improper operations in the machine, as by the use of an error key, etc., all of which will hereinafter be more particularly described and pointed out in the claims.

In the drawings, 1 indicates a base casting from each side of which rise two side frames 2, and a cross-connecting top frame 3. 4 is a cover or casing for inclosing the moving parts of the machine, on top of which cover is arranged a suitable platen for supporting a sheet of paper to be printed upon, as will hereinafter be more particularly described.

The digit-key stops.

6 indicates the heads or buttons of the digit keys (see Fig. 4) which are numbered from 1 to 9 inclusive, and also contain the zero character, said buttons, as shown in Fig. 2, being mounted on key shanks $6^a$ whose lower ends are enlarged and provided with slots for straddling the forward ends of key-bars 7. These key-bars are pivotally mounted on a pivot-pin $7^a$ arranged in lugs or brackets extending up from the base of the machine, the rear ends of said key-bars engaging notches, respectively, in the feet $9^a$ of stop-operating bars 9 (see Fig. 6). These stop-operating bars are guided in their vertical movement by plates 10, and each bar is provided with a jog or bend $9^b$ constituting a cam face for coöperating with a pin or lateral projection $11^a$ arranged on a vertical series of horizontally movable bars 11. The plates 10 before referred to which constitute the vertical guides for the bars 9, are preferably bent from a vertical plate $10^a$, whose side edges are bent as at $10^b$ and formed with openings in which the bars 11 are mounted. This vertical plate $10^a$ is secured in any suitable manner to a post $1^a$ extending up from the base of the machine. The forward ends of the bars 11 are reduced and coöperate with springs 12 which tend to hold the bars 11 rearwardly.

The operation of the parts above described is as follows: Whenever a key is operated, one of the bars 9 is elevated and its jog or bend forces the bar 11 controlled thereby forwardly. When the "1" key is depressed the lowermost bar 11 is moved forwardly; the depression of the "2" key will move the next bar 11 forwardly, and so on, the "9" key moving the uppermost bar 11 forwardly. When a key is released, the spring 12 which has been depressed by the forward movement of bar 11, forces said bar rearwardly coincidentally depressing the corresponding bar 9, and in this manner the key is returned to its normal position. A spring $7^c$ connected to the forward end of each bar assists in restoring the key-bar.

Traveling carriage.

13 and 14 indicate tracks shown as being hexagonal in shape and having grooves in their inwardly presented faces in which grooves extend projections on frame 15 of the traveling carriage, which frame is preferably made by bending a single piece of metal, as shown in Fig. 21, whereby the top member is integral with the side member, the lower member being extended laterally so as to provide a support for the escapement rack hereinafter referred to.

16 indicates a post serving to hold the free ends of the frame in proper relation to each other and also providing a mount for clamping-screws 17 which pass through said posts for holding the plate mounts for the lifting bars in position. These plate-mounts consist of flat plates 18 and grooved plates 19, both of said plates having recesses in their upper and lower ends, respectively, so as to fit the top and bottom members of the traveling carriage frame. The grooved plate 19 is provided with stop-projections $19^a$ between which the lifting bars 20 are guided. These lifting bars are preferably arranged in pairs, and connected by a U-shaped spring 21 which will hold said bars projected or retracted, as the case may be. There are a plurality of vertical series of these lifting-bars shown in Fig. 6, and, in operation, these bars, of which there are nine in each vertical series, are designed to be successively brought under control of the push-bars 11 as the traveling frame moves from right to left. Normally, the first series of lifting-bars is in line with the push-bars so that when any push-bar is depressed its corresponding lifting bar is moved forwardly and the escapement mechanism operated so as to advance the carriage a distance of one step and place the projected lifting-bar in control of the units or cents rack-bar. Whenever another key is depressed the same operation occurs; that is, one of the series of lifting-bars under control of the push-bar, being the second series from the left, is pushed forward, when the escapement mechanism will operate on the upward movement of the key and place the projected lifting-bar in control of the units or cents rack-bar, at the same time advancing the first-position stop-key into position to control the tens or dimes rack-bar.

*The escapement mechanism.*

Referring to Fig. 7, 22 is a vertically movable bar having a lateral extension $22^a$ over the rear ends of all of the key-bars 7. Bar 22 is held in its lowermost position by means of a spring $22^c$. Said bar 22 is mounted by a slot-and-pin connection on a post $1^b$ extending up from the base-plate of the machine. The upper end of this post is slotted on its forward side, as at $1^c$ to receive and guide a rearward extension of the vertically movable frame hereinafter described. A spring 23 whose upper free end is bent as shown, serves to act as a buffer and a friction device to engage the rearward extension of the frame and hold the same against accidental displacement. The upper end of the bar 22 is provided with an escapement tooth $22^b$ which coöperates with the teeth $24^a$ on an escapement plate 24 secured to the lower frame member of the traveling carriage. Normally, when the traveling carriage is in its lowered position, the tooth $22^b$ lies just under and slightly in advance of the second tooth $24^a$, so that when a key is depressed and the bar 22 raised, the tooth $22^b$ will rise in the path of one of the teeth $24^a$. The upper end of bar 22 engages with a pin or projection $25^a$ on the end of an escapement pawl 25 (see Fig. 5) whose tooth $25^b$ normally rests in front of the first escapement tooth $24^a$. When the bar 22 is raised to place the escapement tooth $22^b$ in front of the second tooth $24^a$, the escapement pawl 25 is likewise raised and the slight movement of the carriage to the left, looking from the front of the machine, or to the right, looking from the rear of the machine in Fig. 6, will raise the tooth $25^b$ above the first escapement tooth $24^a$, and when the key is released to permit the bar 22 to fall, the escapement pawl 25 will likewise drop, and its tooth $25^b$ will engage the second escapement tooth, permitting the carriage to move one step. A spring 26 tends to hold the pawl 25 in its lowered position. A bracket $27^a$ secured under the end of the rail 13 provides a support for the escapement pawl 25. The spring $26^a$ (see Fig. 5) has one end secured to an extension of rail 13, its other end being connected to the traveling carriage so as at all times to move said carriage leftwardly. $1^d$ indicates posts or supports rising from the base-plate of the machine for supporting a guiding plate 27 secured to the upper end thereof (see Fig. 2). 29 and 30 indicate members of a vertically movable frame whose upper ends are slotted to receive guiding screws or rollers $3^a$ of the cross-frame 3. These side frame-plates are connected together by a tie-bar 31, and each has a rearward extension or bracket $29^a$ and $30^a$ between which the top track rail 14 is mounted. These side frames also have rearward extensions $29^b$ and $30^b$ constituting brackets in which the lower track rail 13 is mounted. The extension $30^b$ is the one which coöperates with the groove $1^c$ and the spring 23 referred to (see Fig. 7). Each of the vertically movable side frame-pieces 29 and 30 has a link 32 pivotally connected thereto, to the lower ends of which links are pivotally connected rock-arms 33 mounted upon a rock-shaft 34 (see Fig. 12). The means for operating these rock arms 33 comprise cams 35 mounted upon a rock shaft 36 the grooves in which receive rollers $33^a$ on the arms 33.

The shaft 36 has the operating handle 37 mounted upon a stud-shaft in alinement therewith, preferably at the right hand end, and when this handle is pulled forward, as shown in Fig. 13, both arms 33 are raised and with them the vertically movable side frames 29 and 30. It will be noted in this connection that the slots in the cams 35 are provided at each extremity with concentric portions, the fluctuation occurring midway the slots. In this manner, the first movement of the handle, during which certain operations hereinafter described occur, permits the frame-plates 29 and 30 to remain stationary. The further movement of the handle will elevate said frame plates and the final movement of the handle will hold them elevated while the handle continues its forward movement.

*The totalizer actuating devices.*

Assuming that a number has been set up on the key-board and that the lifting bars 20 in the traveling carriage have been positioned, the handle is now pulled to introduce the number into the totalizer, which operation effects the following: As the side frames 29 and 30 rise by the action and the fluctuation of the cam 35, the traveling carriage will likewise rise. It is obvious that the traveling carriage must be held in a fixed position on its track rails in this movement, so as to prevent accidental displacement thereof which might destroy registration between the positioned lifting bars and the proper denominational racks with which they are to coöperate. This means consists in a series of notches $24^b$ in the toothed escapement plate 24 which coöperate with a locking bell-crank lever 40 pivotally mounted upon the side frame-plate 29 and held downwardly by a spring 41. (See Fig. 21.) When the side frame-plate is in its lowermost position, the lower end of this bell-crank lever strikes a confining bail 42 mounted on the guiding part 27 which is secured to the upper end of the posts 1$^d$ and holds the upper end of the bell-crank lever out of engagement with the notches and plate 24 whereby the carriage can travel in either direction. When, however, the handle starts to move forward and lifts the frame-plates 29 and 30, the locking pawl 40 is likewise lifted so that its upper end will engage with a registering notch in the plate 24 and lock the traveling carriage in whatever position it may be at the time it is lifted. The lower end of the locking pawl 40 comes in contact with a pin on the plate 29 to which its operating spring is connected. When the plates 29 and 30 are lowered, the locking pawl is raised to release the plate 24.

The number having been set up by pushing the lifting bars forward and the traveling carriage having been locked in position upon the initial lifting movement, the continued upward movement of the traveling carriage will cause the lifting pins or bars 20 therein to come into contact with overhanging projections or shoulders 43$^a$ on the rack bars 43. These shoulders are preferably made slightly wider than the thickness of the rack bars so as to afford an ample bearing-face for coöperation with the lifting pins or bars. (See Fig. 6.) These racks 43 are guided in their vertcial movement by the plates 27 and by cross-bars arranged between the side frames of the plates which house the printing mechanism to be hereinafter referred to. The upper ends of these racks 43 carry printing type 44 which are brought into printing line opposite the platen and struck by hammers of a printing mechanism which will be hereinafter described. It is obvious that the "9" lifting pin will first come in contact with its shoulder 43$^a$ and that the "1" lifting pin will be the last to come in contact with its shoulder 43$^a$. When, however, these lifting pins have all been raised against their respective shoulders and the racks 43 are lifted, whether on an excursion of one tooth or nine teeth, the first upward movement of said racks will cause the locking bars 45, pivoted to the rear edges of the racks and having a jog or bend 45$^a$ constituting a cam face for coöperating with the bail 42, hereinafter referred to, to be swung so that their upper ends will move into position under the lifting pins in engagement with the active racks, respectively. By this means the lifting pins are positively locked to the racks and can partake of no independent vertical movement.

As the traveling carriage is positively raised and lowered it will be observed that in thus locking the racks thereto the racks likewise must be positively raised and lowered in their differential excursions and hence no over or under throw of the racks is possible. As the racks descend after having completed their excursion, whether of one tooth or nine teeth, the jog or bend 45$^a$ will engage the beveled edge of plate 27 and move the upper end of the locking bar 45 from under the lifting pin with which it had coöperated. When the racks are differentially raised bv the lifting pins, the totalizer is thrown into mesh therewith so that the denominational wheels thereof will be rotated upon the downward movement of the racks in the introduction of items into the totalizer.

Referring now to Fig. 2, 46 indicates the totalizer wheels which are strung on a shaft 38 which shaft is mounted in a rocking-frame 48 whose lower end is pivoted upon a shaft 49. The means for effecting the engagement and disengagement between the totalizer wheels and the racks is best seen in Fig. 12, wherein it will be observed that one of the cam plates 35, before referred to, is provided with a pin 50 which, when the cam plate 35 is rocked forwardly and just prior to the completion of the forward movement thereof, will come in contact with a bell-crank lever 51 pivotally mounted on a shaft 52, extending beyond one of the frame plates which houses the carrying mechanism. The other end of this bell-crank lever 51 is provided with a plate 53 which is adjustable toward and from the pivot shaft 52 whereby the throw of the totalizer carrying-frame 48 may be adjusted to take up any wear. This plate 53 has a supplemental plate 54 mounted thereon and containing a V-shaped notch in its rear edge, which notch coöperates with a pin 55 on the upper end of one of the frame plates 48. The plate 53 is also provided with a V-shaped notch shown in dotted lines, but it is deeper than the notch in the plate 54. When the plates 53 and 54 are adjusted relative to each other, the notch in the plate 53 will control the engagement between the totalizer wheels and the racks, making such engagement adjustable so as to avoid as much lost motion as possible and at the same time prevent undue friction. The shallow notch in plate 54 adjusts the totalizer wheels with respect to the carrying segments and likewise avoids lost motion and prevents undue friction. The inclined surfaces of the V-shaped notches in the plates 53 and 54 may thus be made to intersect each other for the purpose mentioned, as the pin 55, in the two positions of the totalizer wheels, will engage the outer edges only of the notch in the plate 53 and the bottom of the notch in plate 54 in its relation to the racks and carrying segments, respectively. This adjustment also enables the parts to be adjusted to compensate for irregularities in manufacture. The plate 53 is provided with a hook portion 53$^a$ at its outer rear edge whose function is to engage and hold the totalizer wheels into engagement with the racks during the rearward movement of the handle.

From the above it will be seen that as the handle approaches the forward extremity of its movement, the pin 50 will engage the bell-crank 51 and move the plates 53 and 54 downwardly until the hook 53ª engages the pin 55. As the handle starts rearwardly, this engagement continues until a pin 56 on the cam 35 strikes the front edge of the bell-crank lever 51 and rocks it part-way back to its normal position until, or to such a position wherein, the pin 55 coöperates with the inclined faces of the notches before referred to, when a spring 57 connected to the upper end of frame 48 will complete the movement and center the notch on the pin 55. This movement carries the lower arm of the bell-crank lever 51, which had been rocked by the pin 50 into the path of the pin 56, out of the path of the pin 56 so that when the handle is again moved forwardly the pin 56 will pass under the arm of the bell-crank lever after operating it.

*The carrying mechanism.*

The upper end of frame 48 carries a shaft 58 upon which are mounted a series of tripping pawls 59. (See Fig. 2). Each of the totalizer wheels 46 carries a double-faced tooth 46ª on the left constituting a tripping projection for coöperating with the tripping-pawl 59. The upper member of each tripping-pawl coöperates with the under side of a retaining pawl 60, said retaining pawl being pivoted upon a shaft 61 and being held with its upper end adjacent the tripping-pawl 59 by means of a spring 62. The lower end of this retaining pawl 60 coöperates with a lateral projection 63ª on the carrying segment 63. This carrying segment is pivoted upon a shaft 64 and is normally pulled in an upward direction by means of a spring 65. The pin 63ª is normally under the lower end of the retaining pawl 60, and if, in the operation of introducing an item into the totalizer, the tripping projection 46ª rocks the carrying-pawl 59 upwardly, said carrying pawl will rock the retaining pawl so as to move the lower end thereof behind the projection 63ª. (See Fig. 3). The spring 65 tends to move the carrying segments 63 upwardly when the pin 63ª is thus released, but this is prevented by means of a bar 66 mounted in rock arms 67 and fixed to the shaft 64. This bar 66 is moved to a position immediately above the upper edges of the segments 63 so that when said segments are released they can only rise a very slight distance, sufficient to place the lower end of the retaining pawl behind the pin 63ª to prevent interference with the rising of the carrying segments when the bar 66 is raised. This is done to avoid an extra stroke of the handle to insure a full carrying in the totalizer. After the bar 66 is permitted to remain above the segments 63 and the segments 63 to rise, it would be obvious that said segments, being out of engagement with the totalizer wheels at the time the carrying is effected (the carrying is only effected when the totalizer wheels are being actuated by the racks), another movement of the handle would be necessary to depress the carrying segments to effect the carrying.

In the construction herein disclosed, the carrying segments are tripped and ready to effect carrying when the totalizer wheels are reëngaged therewith at the final rearward movement of the handle, and after the totalizer wheels have been reëngaged with the carrying segments means are provided to operate the bar 66 to permit the carrying segments to rise and effect the carrying. This means is best shown in Fig. 9, wherein 68 is a rock arm on the end of shaft 64, which rock arm, at its outer end, carries a sliding bolt 69 mounted in a slotted sleeve portion thereof, a pin 70 extending out through the slot and coöperating with a spring 70ª on the arm 68, whereby the bolt is normally held outwardly into the path of a cam face 71ª at the upper forward edge of the cam plate 71 mounted on the handle shaft 36. When the handle is pulled forwardly, the cam face 71ª causes the bolt 69 to be retracted and the arm 68 is therefore not vibrated. When the handle reaches its forward position and the totalizer wheels are in mesh with the racks, the bolt 69 is released and projects laterally in the path of the cam face 71ᵇ on the rear upper edge of plate 71.

As the handle now starts its rearward movement, the bolt 69 is caused to pass over the heel portion 71ᶜ of plate 71, the purpose of which is to force the bar 66 downwardly to an abnormal position so as to insure any of the segments 63 being restored thereby to move to such an extent that their projections 63ª will provide a sufficient clearance for the retaining pawls 60 to move thereover. During the rearward movement of the handle, the bolt 69 rides on the concentric portion of the plate 71, during which time the bar 66 is held slightly above the carrying segments 63; and if, in this position of the parts, any of the tripping pawls should be tripped, the retaining pawls 60 will release their respective carrying segments and permit the pins 63ª to rise in front thereof so as to prevent reëngagement and, at the same time, the tripping pawls 59 will engage with the shoulders of the retaining pawls so as to hold them elevated. Just as the handle reaches the rearward extremity of its movement, and after the totalizer wheels have been withdrawn from the racks and thrown into engagement with the segments 63, the pawl 69 drops in front of the plate 71 which results in raising the bar 66; and all carrying segments which have been released will now be permitted to rise under the impelling action of their springs 65 and rotate the totalizer wheels in engagement therewith the distance of one tooth. The totalizer thus standing fully carried, will yield a correct total at any time, without necessitating an idle stroke of the handle.

If another item should be introduced into the machine, the carrying segments would remain elevated until the handle reached its forward position. As the handle in its final forward movement disengages the totalizer wheels from the carrying segments and causes them to mesh with the racks, it will be obvious that, as the handle starts its rearward movement to restore the carrying segments, such restoration will be effected during the time that the totalizer wheels are out of engagement therewith.

Taking a total.

The operation of taking a total is performed by causing the totalizer wheels to be engaged with the racks before the handle starts on its forward movement and raising the racks so that said racks will be lifted until the totalizer wheels are arrested by the tripping pawls 59 engaging the tripping projections thereof. By thus reversely rotating the totalizer wheels and controlling the racks therefrom, the type in the printing line will exhibit the correct total in readiness for making a printing impression thereof. The operation of taking the total is commenced primarily by depressing a total key 72 essentially like the digit keys so far as its button and shank are concerned, except that the word "Total" or "T" is preferably placed on the button for indicating its purpose. This total key coöperates with a key-bar 73 (see Fig. 9) pivoted at 74 and carrying at its rear end a link 75 having a slot-and-pin connection with a rock-arm 76 pinned to the shaft 52 on which the bell-crank lever 51 heretofore described is mounted. Thus, when the total key is depressed, there is a slight lost motion at the initial movement of the key due to the slot-and-pin connection before mentioned, the final depressing movement of the key rocking the shaft 52 and raising the plates 53 and 54 so as to force the totalizer wheels into mesh with the racks. The means for holding the total key depressed consists of a latch 77$^a$ which is bent up from a plate 77 pivoted at 78 to the base of the machine. (See Fig. 11.) This plate is normally swung so that the latch will engage the total-key bar 73 by means of a leaf spring 79 secured to the base plate of the machine by a screw 79$^a$ (see dotted lines in Fig. 5). The total-key bar 73 is provided with an opening 73$^a$ into which this latch normally rests, but when the total key is depressed the lower edge of the opening engages the inclined face of the latch to force the same laterally, and when the latch is released it will be swung under the total key, as shown in Fig. 11. To release the total key when the handle reaches the forward limit of its movement, an arm 81 secured on the shaft 36 through the medium of a cam face on the lower edge thereof, engages a pin 77$^b$ on the plate 77 and moves the latch 77$^a$ from under the total key. When the total key is thus released at the forward end of the stroke, the totalizer wheels will stand clear at the end of the total taking operation, but if it is desired to retain the total in the machine the total key should be held depressed so as to permit the latch to take its position thereunder when permitted to do so by the disengagement of the rock-arm 80.

The purpose of providing a lost motion at the commencement of the depressing movement of the total key is to enable the positioning of certain parts incident to the taking of a total in the machine shown. I will here state that, in the operation of introducing items into the totalizer wheels, the racks are lifted by the traveling carriage and constitute the actuating elements to operate the total wheels. In the total-taking operations, the totalizer wheels constitute the actuating elements to operate the racks, and it is desirable to connect the totalizer wheels with their drivers, respectively, before they become meshed with the racks. It may be advisable, at this point, to state that the shaft 38 on which the totalizer wheels are mounted, is provided with a slot or longitudinal groove (see Fig. 18) in which is mounted a comb-plate 82 whose teeth project through slots in washers interposed between the totalizer wheels. The comb teeth normally lie between the totalizer wheels in such a position that they will not engage or interfere with their independent rotation, but when the teeth occupy a position wherein they will engage the tripping projection of the double-faced tooth of each totalizer wheel, and, as the shaft carrying the comb-plate is rotated, said comb teeth will pick up the totalizer wheels, or such of them as have been operated and moved to a position other than the zero position, and positively rotate them to their zero position.

This comb-plate has one end connected to a collar 84 mounted on the shaft 38, which collar has a reduced annulus for coöperating with a forked arm 85 pinned to the longitudinally movable shaft 86. (See Fig.

14.) This shaft 86 is provided with a pin 86ª, which coöperates with a cam face 87ª on a lever 87. The upper end of this lever is provided with a projection 87ᵇ to arrest the initial movement of the lever. A spring 88 normally holds the lever retracted. Lever 87 is pivoted at 89 to one of the frame plates 48, its lower end resting upon a pin 90ª on a rock arm 90. The arm 90 is fixed to a shaft 91 to which is also fixed a rock arm 92 pivotally connected at 93 to the link 75. Thus, when the total key is depressed through the instrumentalities just above described, the cam plate is moved longitudinally so that the teeth thereof will be in a position to engage the tripping projections of the totalizer wheels. This positioning of the comb-plate occurs upon the initial movement of the total key, and while the link 75 is rising idly with respect to the rock-arm 76 by virtue of the slot-and-pin connection before referred to. 94 indicates a gear wheel or pinion formed on or conjoined to the hub 84 and which is normally disengaged from a rack 95 suspended by a horizontally disposed slot 95ª extending inwardly from the side frame-plate 30, the lower end of this rack being guided by the plate 27 before referred to.

As shown in Fig. 16, a plate 96 is fastened to the inner side of this rack 95 and flush with the outer edges of the teeth thereof, so as to constitute a blind side to the rack teeth, the upper edge of this plate 96 being cut away as at 96ª so as to permit the sliding engagement of the pinion 94 into mesh with the rack, and when the frame 29—30 is raised and the teeth of the pinion 94 pass outside of the plate 96, the said pinion will be kept in mesh with the rack until the frame shall have completed an entire stroke,—that is, shall have been moved up and then down again to its home position. When the frame reaches its home position, the cut-a-way portion of the plate permits the pinion 94 to be withdrawn from mesh with the rack, and this is done by means of a spring 85ª arranged on the shaft 86 and bearing against the hub of the yoke 85. When the pinion 94 is withdrawn from the rack 95 it moves into engagement with the teeth on a plate 97 secured to the adjacent side frame-plate of the carrying mechanism. This plate 97 is arch-shaped and is provided with teeth in its overhanging portion as shown in Fig. 12, so that when the totalizer wheels are thrown into mesh with the racks, if the gear 94 is not in mesh with its rack 95, said gear will be held against rotation by the teeth in the overhanging portion of said locking plate. Thus, the gear 94 and its comb-plate will be held against rotation at all times except when it is moved longitudinally into engagement with the rack 95.

The purpose of so maintaining the position of the comb-plate is two-fold; first, the teeth must be in a position so that they will not strike any tripping projection but in their lateral movement will pass immediately in front or immediately behind adjacent tripping projections, and secondly the comb-plate must make nine-tenths of a revolution forwardly and backwardly, and when released from its driving power and disconnected from the totalizer wheels, it must leave the said totalizer wheels in their zero position. By so maintaining the comb-plate and its connected driving pinion 94 in a given position, the teeth of said wheel 94 are in proper position for registration and mesh with the rack 94. The teeth of pinion 94 are preferably of such width that they will bridge the space between the locking teeth of plate 97 and the rack 95 so that at no time is the wheel 94 left free to turn, and the opposing teeth of the locking plate 97 are so positioned that wheel 94 cannot leave one without becoming engaged by the other in the movement of the totalizer frame 48. Mention has heretofore been made to the fact that the rack 95 has a horizontal slot in its upper end by which it is mounted on a stud on the side frame 29. The lower end of the rack is made plain and is free to swing slightly on its pivotal support, a spring-pressed roller 98 being provided to hold the same in a forward position. The frame 48 is provided with a bracket extension 48ª in which there is a roller 48ᵇ whereby when the vertically movable frame 29 lifts the rack the roller 48ᵇ will hold it in mesh with the gear 94. If the totalizer wheels should be thrown out of mesh when the handle reaches its forward position so as to clear the machine (the total key being permitted to rise to do this), it follows that the frame 48 will swing forwardly while the gear 94 is in mesh with the rack 95. The slotted mounting of the upper end of the rack permits the independent forward movement of the rack so that it will follow the gear 94 and remain in mesh therewith, the roller 48ᵇ holding it into mesh so that, as the rack descends, the gear 94 will be rotated to its normal position.

To retain the total in the machine, the total key is held depressed when the handle reaches its forward movement so as to maintain engagement between the total wheels and the racks whereby, when the racks descend, they will rotate said total wheels back to the position they occupied before the total was taken. As the bell-crank lever 51 normally lies in position to be struck by the upwardly projecting end of the post 50 (see Fig. 8) when the handle approaches the forward limit of its movement, means are provided to shift the bell-crank lever 51 to one side of the extension of post 50 so that said bell-crank lever will not be in a position to be operated by the post and in this way interfere with retaining the totals in the machine.

The means for shifting the bell-crank lever 51 to one side consists of a lever 64$^a$ pivotally mounted on the shaft 64 and having a cam-face projection 64$^b$ which coöperates with a pin 52$^a$ on the shaft 52. To the end of the lever 64$^a$ is connected a link 75$^a$ having a pin 75$^b$ which rests on a lateral projection 75$^c$ extending from the link 75. Thus, when the link 75 is raised by the total key, the lever 64$^a$ is rocked and its cam face in engagement with the pin 52$^a$ moves the shaft 52 and its bell-crank lever 51 laterally with respect to the projection on the post 50, so that when the bell-crank lever is in this position the said post-extension will not strike it. A spring 51$^a$ connected to the bell-crank lever tends to return these parts to normal position when the total key is released.

To prevent the bell-crank lever 51 from being returned to its normal position prior to the time that the handle reaches its home position, I mount a hook-lever 75$^d$ on a bracket extending up from the base of the machine (see Fig. 9), which hook-lever has a spring 75$^f$ connected therewith tending to hold it forwardly in position to place its hook under a pin 75$^e$ on the link 75$^a$. The cam-plate 71 strikes an upward extension of this hook-lever and moves it backwardly so as to disengage its hook from the pin 75$^e$. When the total key is depressed the lever 75$^a$ is raised so as to place its pin 75$^e$ above the hook, and when the handle starts forward the cam-plate 71 permits the hook-lever to move forwardly to engage said pin, and in this manner the link 75$^a$ is held in its lifted position and the bell-crank 51 laterally displaced notwithstanding the fact that the total key may rise, this displacement of the above-mentioned parts continuing until the handle approaches its home position, when the cam-plate 71 will strike the hook-lever and release the link 75$^a$.

To prevent the arm 68 from being operated to restore the carrying mechanism in total-taking operations, which action will tend to lock the machine because the tripping projections are on the wrong side, I provide means as shown in Fig. 10, to disable the spring pressed bolt 69 and hold the same retracted during total-taking operations. This means consists of a pin 64' on the arm 64 which engages a shoulder on an arm or lever 64$^c$ held depressed by a spring 64$^d$. The forward end of this lever is provided with a downwardly extending guard plate or projection. When the total key is depressed, the pin 64' is raised so as to permit the arm 64$^c$ to descend and the guard plate on the forward end thereof to extend in front of the pawl 69. The pin 64$^e$ limits the downward movement of arm 64$^c$. When the handle is pulled forward the cam plate 71 retracts the pawl 69 and the guard plate is permitted to fall in front of said pawl and hold it retracted so that in the rearward movement of the cam plate 71 the pawl 69 will not ride up over the cam face 71$^b$ on the heel portion 71$^c$ as in ordinary operations of the machine wherein items are being introduced and accumulated in the totalizer, and in connection with which the carrying mechanism is operated.

The dash-pot.

The shaft 36 carries a rock-arm 99 to which is connected the piston rod 100 whose piston is arranged in a dash-pot 101 pivotally connected to a bracket extension extending up from the base-plate (see Fig. 5) whereby the stroke of the handle is regulated and cushioned. I prefer to have this in the form of an air cushion, for, by so doing, I avoid tight packings and am enabled to arrange the piston in nearly horizontal position.

The operating handle.

The shaft 36 on which the cams 35 are mounted has a rock-arm 102 pinned thereto (see Fig. 19), to which is connected a link 103 (see Fig. 5), the rear end of said link being slotted and guided upon a screw 104 carried by a bracket 105 (see Fig. 1). 106 indicates a spring arranged upon a pin at the rear end of link 103, the forward end of said spring being connected to a pin 107 mounted in the quadrant plate 108, which pin 107 extends through said quadrant plate and also provides a mount for a spring 109 whose rear end is attached to a bracket fixed to the base of the machine. The quadrant plate 108 is connected to a notched segment plate 110 constituting a part of the full-stroke mechanism to be hereinafter described, which notched segment is secured to a sleeve or head 111 mounted in one of the side frames 2 and in a bracket-bearing 2$^a$ secured thereto as shown in Fig. 19. The shaft 36 finds a loose bearing in this sleeve 111. 112 indicates a short stud-shaft extending from the hub of the handle 37, said shaft having a V-shaped notch 112$^a$ formed near its inner end in which fits a plunger 113 held inwardly by a spring 114. The outer end of sleeve 111 is provided with two projections, 111$^a$, whose edges are beveled slightly, these projections coöperating with projections 112$^b$ on the hub of the handle. The inner end of the stud-shaft of the handle is slightly beveled, as shown, so that when it is placed in position it will force the pin 113 upwardly, said pin finding a seat in the recess 112$^a$ when the handle is home, and tending to hold the same against outward displacement.

The projections 111ª and 112ᵇ coöperate with each other so that, when the handle is pulled forward, it is instantly locked to the sleeve 111, but when the handle is moved rearwardly, if it should be carried beyond its intended stroke, the cam faces of the projections 111ª and 112ᵇ will force the handle outwardly so as to disengage it from the sleeve 111. In this manner, no injury can be done to the machine by too quick a return of the handle. It will be noticed that the lugs 111ª and 112ᵇ are spaced apart sufficiently to give the handle a slight movement rearwardly before the lugs contact with each other, and this slight movement is sufficient to enable the pin 113 to ride out of its notch so as to permit the disengaging movement of the handle.

The handle is positively locked to the sleeve 111 on its forward stroke, the quadrant plate 108 is positively rocked at each movement of the handle, and the springs 106, 109 placed in tension. If anything should happen to the mechanism so as to prevent the shaft 36 from being rocked, it is obvious that spring 106 will be extended without communicating motion to the machine. A lug 108ª on the quadrant plate strikes a rubber or leather plug in the upper end of a post 1ᶠ and limits the forward movement of the handle.

*The full-stroke mechanism.*

The notched segment hereinbefore referred to as constituting a part of the full-stroke mechanism, is positively operated by the handle at each stroke. There are mounted upon the shaft 36 so as to move with this notched segment in the normal operation of the machine, two arms 115 and 116. These arms normally coöperate with a double pawl 116ª pivoted at 117 and whose forward extension is beveled so as to coöperate with a spring-pressed holding plug 118. This plug is mounted upon a leaf spring, as shown, and when the parts are in the position shown in Fig. 2 and the handle is ready to be pulled forward, the double pawl 116ª will be held in a position to fall into the notches of the notched segment and prevent any backward movement of the handle until the handle has completed its forward stroke.

As the handle completes its forward stroke, the arm 115 strikes a pin 119 carried by the double pawl and reverses the position of said pawl so that the apex of its forward end will be placed above the plug 118, and the upper end of the pawl will now be in a position to drop into the notches of the plate 110 in the event that it should be attempted to pull the handle forward before it has completed its rearward stroke. To avoid the rattling noise of the double pawl riding over the notched periphery of the plate 110, I mount a spring 120 on the double pawl whose free end engages the side face of the segment 110 whereby sufficient friction is produced on the spring to tend to rock the double pawl and hold it out of contact with the periphery of the plate 110. If, however, the movement of the handle should be reversed, this friction throws the double pawl into engagement. This friction spring acts in both positions of the double pawl to hold either the upper or the lower pawl out of contact with the edge of plate 110, and thus the rattling of the pawls riding over the notches is prevented.

When the handle is returned to its home position, the arm 116 strikes the pin 119 and reverses the position of the double pawl.

*Error key.*

121 indicates an error key whose head is preferably marked with the letter "E". This error key is horizontally movable and connected to a rod 122, (see Fig. 1) which rod is guided in suitable blocks extending up from the base-plate of the machine. A spring 123 surrounds the rear end of the rod and tends to hold the same forwardly at all times. (See Fig. 24). The rear end of the rod is in line with a pin 124 arranged upon a segmental gear 125 which is in mesh with a companion segmental gear 126 on the lower end of a shaft 127, whose upper end carries a segmental gear 128 in mesh with a rack 129 carried by the traveling carriage.

In the event that an item has been set up on the key-board and it is desired to correct the same, by pressing the error key rearwardly the pin 124 will be struck, and through the gearing just mentioned, the carriage will be restored to its normal position and all of the lifting bars retracted. To prevent operation of the handle when the error key is pressed rearwardly, a shaft 130 provided with a pin 131 in the path of the plate connected to the error key is rocked so as to rock an arm 132 connected by a link 133 to an arm 134 which normally lies in advance of an extension of the quadrant-plate 108; but when the error key is pressed inwardly, the arm 134 is placed under the extension of the quadrant plate and hence the handle cannot be operated. A spring 135 connected to the arm 132 tends to restore these parts to normal position when the handle is released.

The error-key rod 122 is pivotally connected to a lever 138 pivoted at 138ª to the base-plate of the machine and having a rearward extension 138ᵇ which is designed to engage the plate 77 carrying the total-key latch. (See Fig. 4). In this manner, if the total key should stand depressed, the operation of the error key will swing the plate 77 and release the total key.

In order to release the repeat key hereinafter described when the error key is pushed inwardly, I provide the error key with a pin 139 which engages a bell-crank lever 140, which bell-crank lever coöperates with notches in the shank 141 of the repeat key, being held thereagainst by the spring 142. (See Fig. 30). This lever 141 serves to lock the repeat key in its lowered or partly lowered position, and if the repeat key has been depressed and the error key is operated, it will be released. In order to prevent operation of any of the digit keys when the error key is in other than normal position, I provide a plate 143 (see Fig. 30) which plate is normally held to the right by means of a spring 144. The shank of each digit key is provided with a notch $6^b$ in alinement with the plate 143 when the digit keys are raised. A cam extension $143^a$ lies in front of a shoulder on the error key, and consequently, when said error key is pressed inwardly, the plate 143 is moved to the left and all of the digit keys are locked against movement; so, likewise, whenever a digit key is depressed and the solid part of the shank of the digit key is placed against the edge of an opening in the plate 143, the plate 143 cannot be moved to the left, and constitutes a lock to prevent the operation of the error key when a digit key is depressed.

To lock the error key against movement when the handle is in other than home position, I mount a spring-pressed bell-crank lever $122^a$ on a post $1^g$ extending up from the base plate of the machine, (see Figs. 24–6), the upper end of said lever lying under one of the cam plates 35, and when depressed, holding the lower end of said lever out of the path of movement of the collar $122^b$ on the rod 122 against which the spring for returning the error key, bears. When the handle is rocked forward the cam plate 35 is moved and releases the bell-crank lever whereupon the spring $122^c$ connected therewith forces the lower end of said lever behind the collar $122^b$ and thus the error key is prevented from moving.

*Locking the handle against movement when the total key is in an intermediate position.*

145 indicates a bell-crank lever pivotally mounted on one of the plates to guide the key-shanks in their movement, one member of which is held against the shank of the total key by means of a spring 146. (See Figs. 30 and 31.) The other member of this bell-crank lever coöperates with an arm 147 extending up from a wing plate 148 mounted on the rock shaft 130 hereinafter referred to. The first movement in depressing the total key will place the recess in its shank opposite the bell-crank lever 145 so that the winged plate 148 is slightly depressed and the shaft 130 rocked. The rocking of this shaft 130 will, through the link 133, cause the pivot member 134 to be moved under the extension of the quadrant plate 108, hence the handle cannot be operated. When, however, the total key is in its depressed position, the recessed portion of its shank passes below the bell-crank 145 and hence the pivot member 134 is withdrawn by the spring 135 from under the quadrant extension and the handle may be operated.

*Preventing the operation of more than one digit key at a time.*

All of the digit keys (except the zero key), the repeat key, the total key and the eliminating key, hereinafter referred to, have their key bars in horizontal alinement from a transversely slotted tube 149 constituting a ball magazine, opposite the opening in which are posts $1^e$ secured to the base plate of the machine, which posts constitute limiting stops for the movement of the balls in either direction. These posts are spaced from the tube sufficiently far to permit the bars of the total and repeat keys to pass. The balls, which I have marked 150, in this tube are of such size and number that when any of the key bars shown in Fig. 28 is depressed, the balls are moved laterally so as to solidly fill the space in the tube and between the tube and the posts $1^e$ so as to prevent the operation of any other key bar. The tube 149 preferably has a foot extension which is secured to the base of the machine. The purpose of arching the zero key over the ball magazine as shown in Fig. 29, is to step the carriage laterally in repeating numbers. The depression of the repeat key locks all the other key bars against movement, but does not affect the operation of the zero key. To prevent the operation of the keys controlled by the ball magazine when the handle is in other than a home position, I provide a plate 151 whose forward end is provided with a shoulder $151^a$ alined with one of the transverse grooves in the ball magazine. (See Fig. 37.) A spring 152 tends to pull the shoulder 151 forwardly at all times and lock the keys against operation. To withdraw the shoulder $151^a$ when the handle is in home position, I extend the plate 151 rearwardly and support its rear end upon the shaft 36. $151^b$ is a projection with which coöperates a screw $153^a$ mounted in the lower end of a bar 153 pivoted upon one of the side frame-plates of the carrying mechanism. This bar is operated by a pin $71^d$ on the plate 71, and when the handle is home the shoulder 151, through the instrumentalities just described, is withdrawn from the ball magazine.

When the handle is in other than home position, however, the pin $71^d$ is out of engagement with the bar 153, and hence the plate 151 will be thrown forward. The forward movement of the plate causes a cam face 151ᶜ on the front end thereof (see Figs. 30 and 37), to engage with a pin 143ᵇ extending down through the lowermost key-shank guiding-plate, and in this manner the plate 143 is moved leftwardly to lock all the key shanks in position, including that of the zero key. Hence, while the ball magazine serves to lock the bars of all the keys except the zero key, the plate 143 not being operated from the handle, locks the shanks of all the keys with which it coöperates, including the zero key, when the handle is in other than home position.

*Total-key lock.*

It is obvious that whenever a digit key is struck it will rise again, and hence the ball magazine does not constitute a lock for the eliminating key and the repeat key. Hence an example may be set up on the machine, and if the total key is depressed, and the handle pulled, an improper operation of the machine will result. It is not desired to lock the repeat key and the eliminating key against movement after an example has been set up on the key-board, as the operation of these keys under such conditions is proper.

I therefore utilize the winged plate 148, heretofore referred to, to lock the total key against movement in the following manner:

154 is a bell-crank lever having a stepped upper end which coöperates with a lateral projection 73ᵇ on the total-key bar, (see Fig. 34), the other member of said bell-crank being connected to a spring 155 which, when in contact with the base of the machine, tends to hold the stepped upper end under and in engagement with the projection 73ᵇ and which, when the bell-crank is moved to its other position, tends to hold said stepped upper end out of the path of said projection. This is accomplished by causing the spring to pass the pivotal center of the bell-crank 154. This bell-crank is connected by a short shaft 156 to another bell-crank lever 157 whose upper end is provided with a cam face 157ª for coöperating with a pin 158ª on the bar of the eliminating key. The opposite end of this bell crank lever 157 is provided with a pin 157ᵇ which extends under the winged plate 148. (See Fig. 35.) Whenever a number is set up on the key-board, the winged plate is depressed and locks the bell cranks 154 and 157 so as to lock the total key against depression. The total key will then be prevented from operating as long as an example is set up on the key-board. When the handle is pulled, a pin 151ᵈ on the plate 151 will strike the bell-crank 157 and move it so as to lift the winged plate 148 and thus assist in preventing any operation of the digit keys when the handle is in other than home position, and this movement of the bell-crank lever 157 will rock its companion, 154, out of locking engagement with the total key.

*Restoring the traveling carriage.*

The traveling carriage, which contains the lifting pins, is stepped rearwardly upon the successive operation of the digit keys, and when lifted to raise the rack bars, is locked against movement as hereinbefore described. The rack 129, which is mounted upon the carriage and which is in mesh with the segmental gear 128, enables the carriage to be restored to its normal position through the operation of the error key, as above set forth. When, however, the carriage is lifted to raise the racks 43, the rack 129 is disengaged from the segmental gear 128. Means are provided to hold the segmental gear in the position in which it is left by the rack, so that when the traveling carriage descends the rack and gear will reëngage at the same point. This means consists of a post 159 (see Fig. 2), extending up from the base-plate of the machine, and whose upper end is made hollow to receive a plunger 160 having a reduced, pointed end designed to fit in one of a concentric series of openings 128ª in the segmental gear. A pin 160ª extends from the plunger and lies in the path of the rack. When the carriage is in its lowermost position, the plunger is depressed out of engagement with the segmental gear, but when the carriage is raised the rack permits the plunger to rise to lock the segmental gear in position, so that, when the carriage again descends, the rack and segmental gear will be reëngaged at the same point.

The means for restoring the traveling carriage from the operating handle is shown in Fig. 24, and consists of a bar 161 connected to the segmental gear 125. A spring 162 tends to pull this bar rearwardly. A pin 163 in the base plate coöperates with a cam face 161ª on the bar and constitutes a throw-off for the bar. The shaft from which the projections 115 and 116, identified with the full stroke mechanism, extend, is provided with a downward projection 164 (see Fig. 2), which, when the handle is pulled forward, moves behind a shoulder 161ᵇ on the bar 161, and when the handle moves rearwardly, it will catch this shoulder and pull the bar 161 forwardly until the cam face 161ª strikes the pin 163, when the bar will be thrown to one side out of engagement with the rocking projection 164.

Referring now to Fig. 5, it will be seen that as the carriage travels leftwardly, the segmental gears 125 and 126 are free to operate the full limit of travel of the carriage, the bar 161 moving rearwardly in the direction of the arrow to permit this. The stroke of the rocking projection 164 is such that as the handle moves forward it will ride behind the shoulder 161b, whereupon the spring 162 will place said shoulder in front of the part 164, and when the handle moves rearwardly the part 164 will engage the shoulder to pull the bar 161 forwardly and restore the carriage. The throw-off cam 161 is so located with respect to the pin 163 that the carriage is moved an excessive distance to the right so as to fully insure the restoration of all of the lifting pins, and when the throw-off cam-face operates, it causes the shoulder 161b to jump to one side of its operating part 164 so as to prevent engagement therewith until the handle is again operated; hence the part 164 does not interfere in any way with the step-by-step feed of the traveling carriage in the setting up of the next example.

The means for restoring the setting-up pins comprises a plate 165 secured to the track rails 13 and 14, and whose left-hand edge is bent inward slightly as shown in Fig. 5, so as to gradually force all of the lifting pins back to normal position. The excessive movement of the carriage to the right insures the full restoration of the lifting pins. The plate 165 prevents the forward movement of all the lifting pins except those under control of the push-bar.

The repeat key.

The purpose of the repeat key is to enable a number set up on the key-bar to be repeated one or more times, and this repetition may consist in repeated registrations of the number in the totalizer after making a record thereof, or in connection with making a record thereof. If the repeat key is part-way depressed, the number will be repeated in the totalizer and listed,—that is, a record of each registration made. If the repeat key is fully depressed, then no record will be made of the registering operations. This latter operation is desirable in multiplication, where the multiplicand is set up on the key-board and the repeat key fully depressed. The handle is pulled as many times as there are digits in the multiplier, commencing with the units and operating the zero key for each successive denomination. To illustrate the operation of multiplication, we will assume that 25 is to be multiplied by 25. The multiplicand 25 is set up on the key-board, and if it is not desired to record the operations, the repeat key is fully depressed. The handle is now pulled five times, after which the zero key is operated so as to cause the traveling carriage to move one step to the left, which is equivalent to setting up 250 therein, after which the handle is pulled twice. To release the repeat key the error key is operated, and in order to obtain the product, the total key is depressed.

If it is desired to make a record of the above operations, the repeat key is only partially depressed, such partial depression not disabling the printing mechanism from operating; hence the above operations will be listed.

The shank of the repeat key heretofore referred to carries a button on its upper end on which is inscribed the word "Repeat." This shank coöperates with a bar 166 pivoted at 167 to a bracket extending up from the base of the machine. A spring-pressed lever 168 tends to hold the key-bar depressed. (See Fig. 24.) 169 indicates a link having a slot-and-pin connection with the bar of the repeat key, said link being preferably composed of two parts threaded together so that its length may be adjusted. The upper end of this link is pivotally connected to a bell-crank lever 170 secured to the side frame plate which houses in the printing mechanism. This bell-crank lever 170 engages a longitudinally movable rod 171 which is held in its normal position by means of a spring 172. This rod carries two pins 173 which embrace a link 174 which controls the printing mechanism. This link is provided with an opening in its lower end which coöperates with a pin 175 on one of the cam plates 35, and is normally in engagement therewith. When, however, the repeat key is fully depressed, the rod 171 is moved to the right and carries with it the link 174 so that said link is withdrawn from engagement with the pin 175, and hence the machine may be operated in its registering operations but the printing mechanism is disabled.

When the repeat key is only partially depressed, the link 174 is not moved laterally out of engagement with the pin 175, but is left in engagement therewith by virtue of a slot-and-pin connection between the link 169 and the rear end of the repeat-key bar. The means for holding the repeat key in its depressed and partially depressed positions (see Figs. 32 and 33) consists of the bell-crank lever 140, heretofore described, which coöperates with two notches 141a in the shank of the repeat key. To determine the partially depressed position of the repeat key, I provide a supplemental key 176 held elevated by a spring 177. The shank of this key is provided with a cam portion 176a which coöperates with a plunger 178 held thereagainst by a spring 179 and mounted in a suitable post in the lower guiding plate of the key-bar. The opposite end of this plunger coöperates with the cut-away portion 141b in the shank of the repeat key. When the two keys 141 and 176 are simultaneously depressed, the plunger 178 arrests the key 141 in its partially depressed position so as to enable the bell-crank 140 to enter the lowermost notch 141ª thereof and hold it in such partially depressed position.

If it is desired to fully depress the repeat key, the supplemental key 176 is not operated, which permits the repeat key to be fully depressed. Of course if the operator relies upon the sense of touch he can partially depress the repeat key after operating the supplemental locking key to arrest it in its partially depressed position, as the bell-crank lever 140 will enter the lower notch and hold the key partially depressed. The notches 141ª are beveled on their upper edges so that the bell-crank 140 can be vibrated as the key passes the lowermost notch.

*The printing mechanism.*

The rack bars 43 carry printing type 44 at their upper ends and each of the rack bars is provided with a notch 43ᵇ into which rests one member 180 of a primary releasing pawl. The bars 180 of these pawls (there being one pawl for each rack) are provided with bent-over projections 181 whereby all primary pawls to the right of the pawl in the highest denomination may be raised for the purpose of printing zeros, (see Fig. 22), notwithstanding the fact that the rack bar identified with the column in which the zero is to be printed may not be moved. The zero type are always in the printing line opposite the platen, and the other printing type, from 1 to 9, are raised to the printing line by the movement of the racks. This primary releasing pawl is held against the racks by means of a spring 182 and is provided with a hooked extension 183 for engagement with a secondary releasing pawl 184, which latter pawl is under the variable tension of a spring 185, whose outer end is secured to a cross-bar 186 mounted in the ends of arms 187 extending from side frames which carry the vibrating bail or bar 188 coöperating with the ends of the secondary releasing pawls 184. The secondary releasing pawls carry pins or lateral projections 189 which normally coöperate with the tail-piece 190 of the printing hammers 191. The hub portions of these printing hammers are provided with shoulders constituting tertiary releasing pawls which coöperate with a bar 192 in the form of a cross-bar of a bail-like frame pivoted in the side plates 193 which house in the printing section.

The primary and secondary pawls and the printing hammers are mounted upon circumferentially grooved shafts by means of open-eded slots so that the parts can be readily and easily assembled. The side frames which carry the bar 188 are provided with extensions 194 which coöperate with projections 195 on the side members of the bail 192. The link 174 heretofore referred to as being identified with the printing mechanism, is connected at its upper end to an arm 196 fixed to a shaft 197 upon which the side frames carrying the bar 188 are also fixed, and which shaft constitutes the pivotal point of the secondary releasing pawls.

The operation of this printing mechanism is as follows: When a primary releasing pawl is operated by the upward movement of a rack-bar, it is rocked out of engagement with the secondary releasing pawl 184. As the handle approaches its forward limit, and when all of the rack-bars have been positioned, the link 174 is drawn downwardly so as to operate the bar 188. This places the pawls 184 under increasing tension, and when the portion 194 of the side frame carrying bar 188 strikes the projection 195 so as to move the bail-bar 192 out of engagement with the printing mechanism, the printing hammers strike their hammer blow through the impelling action of the spring 185 and by virtue of the pin 189 lying under the tail-piece of the printing hammers. Each of the secondary releasing pawls is provided with a foot-piece 184ª which is designed to strike against a bar 198 and thereby be arrested, permitting the printing hammer to continue its movement and deliver a quick rebounding blow. In this manner a clear-cut impression is made on the paper, the rebound of the printing hammer, by virtue of its unbalance, preventing it from again striking the type; but even if such a tendency exists, it would be opposed by the springs coöperating with the printing type.

When the handle starts on its rearward movement, the link 174 is raised and the bar 188 moved to its normal position. In this movement it will engage the tail-piece of the printing hammers and the secondary releasing pawl, restoring them to normal position. A spring 192ª holds the bail-bar against the hubs of the printing hammers in readiness to engage the tertiary pawls. When the rack bars are restored home and the portions 180 of the primary pawls drop into their notches, the primary pawls again become connected to the segmental pawls. It is obvious that if the primary pawl is not operated, either by a rack-bar or by the overhanging projection 181 of an adjacent pawl, it will not release the secondary pawl, and hence, notwithstanding the movement of the bell-ranck 192, the printing hammers are not subjected to any impelling action to move, and being over-balanced, will remain in their normal position.

As the link 174 is operated as the handle resumes its forward limit of movement, it is obvious that the printing mechanism will be operated either to print items or totals. It will also be observed that when the repeat key is moved to its lowered position so as to disengage the link 174 from its operating pin, said link will not be vibrated and hence the printing mechanism will be disabled.

Alining the printing type.

Referring to Fig. 2, it will be seen that the rack-bars are provided with a series of notches at their lower ends, which notches have beveled outer edges so as to coöperate with a plate 199 mounted to slide on top of the guide-plate 27. A bell-crank lever 200 pivoted to a bracket secured on the base-plate has a lateral projection on its forward end which coöperates with a cam 201 on the shaft 36. This bell-crank lever carries two arms 200ª which fit in slots in the plate 199. When the handle approaches the forward limit of its movement and after the rack-bars have been positioned, either for the printing of an item or a total, the plate 199 is moved rearwardly into engagement with the registering notch so as to aline the type in the printing line. The double edges of the notches will force the racks up or down if their type are not in exact alinement, and hence, during the printing impression, the rack bars are not only perfectly alined, but absolutely locked by the plate 199 against vertical movement.

Elimination key.

The elimination key is operated when it is desired to print a number set up on the key-board without introducing said number into the totalizer. This elimination key, marked 202, has its key-bar 203 pivoted at a point coincident with the pivot-point of the total-key bar (see Fig. 9) and is connected at its rear end to the link 75ª by means of a slot-and-pin connection; thus, when the elimination key is depressed, the pin on the rear end of its bar, being located in the upper end of the slot, will raise the link 75ª in the manner heretofore described with respect to the movement of said link when the total key is depressed. The elimination key thus shifts the bell-crank 51 laterally so that the totalizers are not thrown into mesh with the rack bars, and a number may be printed without being registered in the totalizer. The slot in the lower end of link 75 permits the total key to raise said link without operating the elimination key. When the elimination key is depressed, the pin 158ª on its key-bar will rock the bell-crank levers 157, 154 forwardly, (see Fig. 35), and thus release the total key if the total key should stand depressed at the time the elimination key is operated. If desired, the pin 158ª may be dispensed with, as the operation of the handle releases the total key.

Releasing the totalizer key by the error key.

When any of the digit keys are operated to set up an example on the key-board, the total key is locked against movement by means of the plate 148 operating the pawl 154. If it is desired to clear the machine by restoring the traveling carriage and the lifting pins to normal position after introducing the items into the register wheels, the error key is pushed rearwardly.

Referring to Fig. 35, it will be observed that the lever 138 when moved rearwardly by the error key, will also move rearwardly a link 188ᶜ, which link carries on its forward end an inclined bent portion 138ᵈ which rests under the rearwardly extending end of the bell-crank lever 157. Whenever the winged plate 148 is depressed by the operation of a digit key, the bell-crank levers 157, 154 will be rocked rearwardly, the latter locking the total key against movement. This movement of lever 157 places the cam face on its rearwardly extending end in position upon the inclined projection 138ᵈ; hence, if the error key should be pressed rearwardly to clear the machine of the items set up on the key-board, the link 188ᶜ will be moved rearwardly and the levers 157, 154 will be rocked forwardly, thus releasing the total key and enabling a total to be taken if it is now desired to do so.

The paper feed.

The rock-shaft which carries the vibrating frame 188 and which is operated by the link 174 is provided with a short rock-arm 204 which has a slot-and-pin connection with the lever 205 pivoted to the bracket secured to the arm 3, (see Fig. 1). This lever connects at its rear end with the vertically movable bar 206 extending up through the casing 4 and having pins 207 on its upper end which engage a bail 208 pivotally mounted in the side framing 209 of the paper carriage. The forward end of this bail carries a platen-feeding pawl 210 which coöperates with a ratchet 211 on the end of the paper platen. In this manner the platen is operated a line space every time the link 174 is operated. If, however, said link is disengaged from its operating pin so as to disable the printing mechanism, the paper line-spacing mechanism remains inactive.

The ribbon feed.

Referring to Fig. 38, it will be observed that two brackets 212 are secured to the top of the casing 4 in the upper ends of which is mounted a shaft 213. This shaft carries bracket extensions 214 at each end, in the outer ends of which are bearings for the spindles of the ribbon-spools 215. On the lower end of each spindle is a ratchet 216. Extending from each bracket 214 is a post or lug forming the pivotal support for a pawl 217, while from the foot of each bracket 212 is a similar post or support forming the pivotal support for a pawl 218. Suitable springs tend to press these pawls against their respective ratchets, they coöperating the said ratchets at their outer edges or heel portions. The free ends of these pawls are provided with inclined faces which coöperate with pins 219 arranged respectively on the ends of a bar 220, said bar being slotted so as to be moved longitudinally and being provided with a suitable handle whereby said movement may be effected. A retaining pawl 221 coöperates with the inclined edges of a projection on the bar 220 to hold it in either extreme position. When the bar is shifted to the left, as shown in Fig. 39, its pin 219 at the right will permit the pawls 217 and 218 to approach each other so that their outer edges will engage the teeth of ratchet 216; while the pin 219 at the left will force its coöperating pawls apart so that they will be disengaged from their coöperating ratchet 216.

The shaft 213 has inwardly extending arms 222 constituting ribbon-guides so as to feed the ribbon in front of the printing type. One of these arms 222, or both, if desired, is provided with a pendant arm 223, pivotally secured thereto, which extends down into the machine where it is preferably provided with a bent lower end in line with either or both members of the lifting frame 29, 30. Normally, the inking ribbon is below the printing line, but when the lifting frame 29, 30 is raised to position the rack bars in introducing an item into the machine or when said lifting frame is raised in the total-taking operation, it will engage the member 223 and swing the ribbon-guiding arms 222 upwardly so as to place the ribbon in the printing line. When the lifting frame descends, the inking ribbon is dropped below the printing line, and hence the impression of the item or total printed is at once made visible.

The rocking of the ribbon guiding arms also effects a rocking movement of the ribbon-spools and their connected ratchet wheels. This rocking movement will cause the teeth of the ratchet in engagement with the operated pawl 218 to effect a feed of the ribbon as the guiding arms are lifted. The pawl 217 which moves with the operated ratchet prevents backward movement of said ratchet. When it is desired to shift the ribbon feed it is only necessary to move the bar 220 to its other position.

While I have shown the paper as being in the form of a strip whose supply roll is mounted in a suitable bracket extending from the casing 4 of the machine, it is obvious that a laterally movable paper carriage could be arranged for supporting the platen, whereby a wide sheet of paper could be used in the machine. It is also obvious that, instead of operating the machine by means of a handle, a motor could be connected to operate the stud-shaft on which the handle is mounted, as is commonly employed in this art.

The idea of lifting the racks by means of a lifting frame and driving the totalizer wheels by a comb-plate, forms the subject-matter of an application filed by William W. Hopkins on April 9, 1909, serially numbered 488,883; and the idea of stopping the repeat key in its partially depressed position by means of a supplemental key, is disclosed in an application filed by Hubert Hopkins May 11, 1908, serially numbered 432,166, and I therefore do not claim these features herein.

What I claim is:

1. In a calculating machine, the combination with a series of keys, a stationary frame containing a plurality of vertically movable cam bars, horizontally movable pins in said stationery frame and coöperating with said cam bars, said pins being arranged in vertical series, a laterally movable carriage containing a plurality of vertical rows of pins which are successively brought under control of said horizontally movable pins, a lifting frame in which said carriage is mounted and racks which are lifted by the positioned pins in said carriage.

2. In a calculating machine the combination of a series of key-bars, a cam-bar operated by each key-bar, a frame in which said cam-bar is slidingly mounted, a series of setting-up bars mounted in said frame and movable at an angle to the movement of said cam-bars, and springs coöperating with said setting-up bars.

3. In a calculating machine, the combination of a series of type carrying racks, rack controlling pins for engaging said racks and moving them, means for positioning said rack controlling pins and moving the same laterally to represent a number, a vibrating frame movable in the direction of movement of said racks, and means for locking the rack controlling pins in said frame.

4. In a calculating machine, the combination of a vibrating frame, a traveling carriage movable across said frame, said carriage containing rack controlling pins, type carrying racks whose movement is controlled by said pins, which pins engage the racks to move them, means for positioning said pins to represent numbers, means for locking the carriage to said frame, and means for moving the frame in the direction of movement of the type carrying racks.

5. In a calculating machine the combination of a vibrating frame, a traveling carriage movable transversely thereof, a series of pins arranged in said carriage, actuating racks with which said pins coöperate, a pawl for locking the carriage to said frame, means for operating the pawl to release the frame, and means for moving said frame and said racks.

6. In a calculating machine the combination of an actuating frame, a carriage movable transversely thereof, an escapement mechanism for controlling the transverse movement of the carriage, key-positioned pins in said carriage, a totalizer, racks for operating said totalizer and which racks are under the control of said pins, and means for locking the carriage in position on the actuating frame.

7. In a calculating machine the combination of an actuating frame, a carriage mounted thereon and movable transversely thereof, said carriage comprising a U-shaped frame, a series of plates arranged therein, certain of which are provided with guiding projections, pins arranged between the plates and guided by said projections, and means for clamping said plates together in the U-shaped frame to hold said pins in position.

8. In a calculating machine, the combination with an actuating frame, a carriage movable across said frame, a rack on said carriage, a lever mounted on the frame, and means for normally holding said lever disengaged from said rack, when said frame is in its normal position, said means permitting the lever to engage the rack and lock the carriage to the frame when the frame is in any position other than normal.

9. In a calculating machine the combination of an actuating frame, a carriage movable transversely thereof, a notched plate on the carriage, a locking pawl coöperating with said notched plate, and means for lifting said pawl out of engagement with the plate when the carriage is in home or in its starting position.

10. In a calculating machine the combination of an actuating frame, a carriage movable transversely thereof, a notched plate on said carriage, a locking pawl for coöperating with said notched plate to lock the carriage against movement when said carriage is in other than its home or starting position, and means coöperating with said pawl to release the carriage when the carriage is in home or in its starting position.

11. In a calculating machine the combination of a lifting frame, denominational racks lifted by said frame, a carriage movable transversely thereof and which carriage is lifted by said frame, a notched plate on the carriage, and a pawl for coöperating therewith to lock the carriage in position whenever said carriage is lifted.

12. In a calculating machine the combination of a lifting frame, denominational racks lifted by said frame, a transversely movable carriage mounted thereon, an escapement mechanism for controlling the transverse movement of the carriage, said escapement mechanism comprising a plate mounted on the carriage and provided with escapement teeth, an escapement pawl movable with the lifting frame and coöperating with said teeth, and a vibrating pawl which coöperates with said teeth but only when said carriage is in its lowered position.

13. In a calculating machine the combination of a lifting frame, denominational racks lifted by said frame, a transversely movable carriage mounted thereon which carriage partakes of all the vertical movements of said frame, a grooved post for coöperating with the frame in its lowered position, and a friction spring on said post for bearing against said frame.

14. In a calculating machine the combination of a lifting frame, denominational racks lifted by said frame, a laterally movable carriage mounted on said frame, lifting arms connected to each side of the frame, and a lifting cam coöperating with each of said arms.

15. In a calculating machine the combination of an actuating frame, denominational racks lifted by said frame, a laterally movable carriage arranged thereon, arms connected to each side of said frame, and a cam for each arm.

16. In a calculating machine the combination of a lifting frame, a laterally movable carriage mounted therein and containing lifting pins, totalizer actuating racks for coöperating with said pins, and means for restoring said lifting frame and returning said movable carriage to its home or starting position.

17. In a calculating machine the combination of a lifting frame, a laterally movable carriage mounted thereon, lifting pins in said carriage, means operated by digit keys for positioning said lifting pins and effecting the lateral movement of said carriage, totalizer actuating racks which are successively brought under control of said lifting pins and means for restoring said lifting frame and returning said laterally movable carriage to its home or starting position, said means also disengaging the pins from said racks.

18. In a calculating machine the combination of a lifting frame, a laterally movable carriage mounted thereon, lifting pins in said carriage, totalizer actuating racks which are successively brought under control of said lifting pins, and means for positively locking said lifting pins to said racks.

19. In a calculating machine the combination of a lifting frame, a laterally movable carriage arranged thereon, lifting pins in said carriage, totalizer actuating racks, and means carried by each rack for locking its actuating lifting pin thereto during the excursion of the rack.

20. In a calculating machine the combination of a laterally movable carriage, a key-positioned pins arranged therein, totalizer actuating racks which are successively brought under control of said pins, means for moving the carriage to actuate the racks, and levers on each rack for locking the pins to the racks during the excursion of the racks.

21. In a calculating machine the combination of a totalizer, actuating racks therefor, means for actuating said racks said means comprising liftable devices which are differentially pre-positioned, means for locking said devices to said racks, and means for lifting said devices.

22. In a calculating machine the combination of a totalizer, actuating racks therefor, a laterally movable carriage, pins variably positioned in said carriage for imparting differential movements to said racks, and means on the racks for locking the pins thereto during the excursion of said racks.

23. In a calculating machine the combination of a totalizer, actuating racks therefor, a traveling carriage containing differentially positioned pins for actuating said racks, and means whereby said racks are positively locked to said carriage during their excursion of movement.

24. In a calculating machine the combination of digit keys and their connections, a vertical series of horizontally movable pins which are operated by said keys and their connections, a driven carriage having a plurality of vertical series of pins which are positioned when they are successively brought under control of said vertical series of horizontally movable pins, a lifting frame in which said carriage is mounted, a series of racks which are successively brought under control of the positioned pins in said carriage whereby when the frame is lifted the racks will be given a differential excursion, adding wheels controlled by said racks, and printing devices which are positioned by said racks.

25. In a calculating machine, the combination of a totalizer, actuating racks therefor, a laterally movable frame, key-positioned devices in said frame for controlling the excursions of said racks, means for moving said frame in a direction longitudinally the racks to effect their excursions of movement, and means for locking the frame in position during the time that it is effecting its rack excursion movement.

26. In a calculating machine the combination of actuating devices, a totalizer movable into and out of mesh therewith, and means for adjusting the throw of said totalizer when moved into mesh with said actuating devices.

27. In a calculating machine the combination of a totalizer, carrying mechanism, and means for adjusting the position of said parts relative to each other.

28. In a calculating machine the combination of a totalizer, means for moving said totalizer, and means for adjusting the relation of said moving means with respect to said totalizer.

29. In a calculating machine the combination of a totalizer, actuating devices therefor, and means for adjusting the position of said totalizer in both of its engaged and disengaged positions with respect to said actuating devices.

30. In a calculating machine the combination of a totalizer, actuating racks therefor, a cam plate for moving said totalizer into mesh with said racks, and means for adjusting the position of said cam plate.

31. In a calculating machine the combination of a totalizer, carrying mechanism coöperating therewith, actuating racks for said totalizer, a cam plate for moving said racks into mesh with said carrying mechanism, and means for adjusting the position of said cam plate.

32. In a calculating machine the combination of a totalizer, actuating racks therefor, carrying mechanism, and means for moving said totalizer into and out of mesh with said actuating racks and carrying mechanism, respectively, said means comprising adjustable cam plates having inclined faces of different angles.

33. In a calculating machine the combination of a totalizer, a pivoted frame in which the same is mounted, a bell-crank lever, and an adjustable cam plate on said bell-crank lever for coöperating with said pivoted frame.

34. In a calculating machine the combination of a totalizer, a pivoted frame in which the same is mounted, a bell-crank lever, an adjustable cam plate on said bell-crank lever for coöperating with said pivoted frame, and means for rocking said bell-crank lever.

35. In a calculating machine the combination of a totalizer, a pivoted frame in which the same is mounted, a bell-crank lever, and two independently adjustable cam plates on said bell-crank lever for coöperating with said pivoted frame to adjustably move the same to different positions.

36. In a calculating machine the combination of racks, a totalizer, a pivoted frame in which said totalizer is mounted, a main operating shaft and connections for vibrating said frame to throw said totalizer into and out of mesh with said racks, a total key for vibrating said frame independently of said operating shaft, said total key rendering the said shaft ineffective with respect to the connections which vibrate said frame, and an eliminating key operable independently of the total key for rendering said connections also ineffective.

37. In a calculating machine the combination of a totalizer and its racks, a vibrating frame on which said totalizer is mounted, a cam-faced lever for vibrating said frame, a main operating shaft and connections normally coöperating with said lever, and an eliminating key for placing said lever beyond the control of the operating shaft.

38. In a calculating machine the combination of a totalizer, carrying mechanism coöperating therewith, a vibrating bar for operating said carrying mechanism, and means for preventing the operation of said bar.

39. In a calculating machine the combination of a totalizer, carrying mechanism coöperating therewith, a vibrating bar for operating said carrying mechanism, a cam for operating said bar, and means for preventing said cam from operating said bar.

40. In a calculating machine the combination of a totalizer and its carrying mechanism, a vibrating bar for operating said carrying mechanism, a rock arm for moving said bar, a spring-pressed bolt in said rock arm, and a cam for coöperating with said bolt.

41. In a calculating machine the combination of a totalizer and its carrying mechanism, a vibrating bar for operating said carrying mechanism, a rock arm for moving said bar, a spring-pressed bolt in said rock arm, a cam for coöperating with said bolt, and means for holding said bolt out of engagement with said cam.

42. In a calculating machine the combination of a totalizer and its carrying mechanism, a vibrating bar for operating said carrying mechanism, a rock arm for moving said bar, a spring-pressed bolt in said rock arm, a cam for coöperating with said bolt, and a total key for holding said bolt out of engagement with said cam.

43. In a calculating machine the combination of a totalizer and its carrying mechanism, a vibrating bar for operating said carrying mechanism, a rock arm for moving said bar, a spring-pressed bolt in said rock arm, a cam for coöperating with said bolt, and an eliminating key for holding said bolt out of operative connection to said cam.

44. In a calculating machine the combination of an operating handle, a sleeve in which the same is mounted, said sleeve being open at both ends, interlocking lugs between the outer end of said sleeve and said handle, a spring-pressed plunger for holding said handle in the sleeve so that said lugs will coöperate with each other, an operating shaft which finds a bearing in the inner end of the sleeve, and spring connections between said shaft and sleeve.

45. In a calculating machine, the combination of an open-ended sleeve, bearings for each end of said sleeve, an operating handle which is adapted to be inserted in and engage the outer end of said sleeve, an operating shaft which finds a bearing in the inner end of said sleeve and is rotated independently thereof, and spring connections between said sleeve and shaft.

46. In a calculating machine the combination of an operating handle, a sleeve, bearings for each end of the sleeve, means for locking the handle to the sleeve, an operating shaft finding a loose bearing in said sleeve, and a yielding connection between said sleeve and operating shaft.

47. In a calculating machine, the combination of an operating rock shaft, key positioned parts operated by said shaft, an error key for restoring all of said key positioned parts independently of any movement of said shaft, and means operated by said error key for preventing the operation of said shaft whenever said error key is in other than normal position.

48. In a calculating machine the combination of digit keys, a total key, means for locking said total key against movement upon the operation of any of said digit keys, and an error key for releasing said total key independently of said digit keys.

49. In a calculating machine the combination of a series of digit keys and parts positioned thereby, means for restoring said digit keys to their raised or normal position immediately after operation, a total key, and means for locking said total key against movement upon the operation of any of said digit keys, an operating handle, and means operated by said handle for releasing the total key.

50. In a calculating machine the combination of digit keys, parts positioned thereby, means for restoring said digit keys to their raised or normal position immediately after operation, a total key, a lock for holding said total key depressed, other means whereby said total key is locked against movement upon the operation of any of said digit keys, and an error key for restoring the parts positioned by said digit keys and releasing said total key.

51. In a calculating machine the combination of a series of key bars, locking devices coöperating therewith, an operating shaft, and means operated by said shaft to lock the key bars against movement when the shaft is in other than home position, and adjustable means operated by said shaft for unlocking said key bars.

52. In a calculating machine the combination of a totalizer and its actuators, a traveling pin carriage for controlling the excursions of said actuators, a rack movable therewith, a segmental gear meshing with said rack, means for effecting a separation between said rack and gear, and means for holding said gear in position during such separation.

53. In a calculating machine the combination of a totalizer and its actuators, a traveling pin carriage for controlling the excursions of said actuators, a rack movable therewith, a gear meshing with said carriage, means connected to said gear for restoring the carriage, means for moving the carriage and rack away from the gear, and means for locking the gear in position when separated from said rack.

54. In a calculating machine the combination of a totalizer and its actuators, a traveling pin carriage for controlling the excursions of said actuators, a rack movable therewith, a gear normally in mesh with said rack, means for moving the carriage and rack away from the gear, and a spring-pressed plunger for holding said gear in position when the rack is separated therefrom, said plunger being disengaged from said gear when the rack is in mesh therewith.

55. In a calculating machine the combination of a traveling carriage, a rack movable therewith, a gear normally in mesh with said rack, said gear having a concentric series of openings, means for moving the carriage and rack away from the gear, and a spring-pressed plunger normally held retracted by said rack, but which, when the rack is moved away from the gear, engages one of the openings to hold the gear in position.

56. In a calculating machine the combination of a traveling carriage, a rack movable therewith, a gear in mesh with said rack, a bar connected to said gear, an operating shaft having means for engaging said bar, and a throw-off mechanism for disengaging the bar from said shaft.

57. In a calculating machine the combination of a traveling carriage, a rack movable therewith, a gear in mesh with said rack, a restoring bar connected to said gear, an operating shaft, means on said shaft for engaging said bar to restore the carriage, and a cam face on the bar coöperating with a projection to disengage the bar from the operating shaft when the carriage is restored.

58. In a calculating machine the combination of a totalizer, actuating racks therefor, printing type which are positioned by said racks, primary pawls individual to said racks, secondary pawls coöperating with said primary pawls, printing hammers having locking shoulders, a bar coöperating with said shoulders to restrain them against movement, and means for operating said bar to simultaneously release all of the printing hammers, said last mentioned means placing the secondary pawls under increasing tension whereby the printing hammers are impelled to permit a rebounding blow.

59. In a calculating machine the combination of a totalizer, actuating racks therefor, printing type positioned by said racks, primary pawls coöperating with said racks, secondary pawls coöperating with said primary pawls, printing hammers coöperating with said secondary pawls whereby said hammers are forced to make an impacting blow, springs connected to said secondary pawls, locking shoulders on said printing hammers, a bar common to said locking shoulders, and a vibrating bar restraining said secondary pawls against movement, said vibrating bar operating said last mentioned bar to release the printing hammers and permit the secondary pawls to operate them.

60. In a calculating machine the combination of a totalizer, actuating racks therefor, printing type positioned by said racks, primary pawls coöperating with said racks, secondary pawls coöperating with said primary pawls, printing hammers coöperating with said secondary pawls whereby said hammers are forced to make an impacting blow, springs connected to said secondary pawls, locking shoulders on said printing hammers, a bar common to said locking shoulders, and a vibrating bar restraining said secondary pawls against movement, said vibrating bar also placing the secondary pawls under increasing tension in its movement to operate the hammer-locking bar.

61. In a calculating machine the combination of a totalizer, racks therefor, printing type positioned by said racks, primary pawls individual to said racks, secondary pawls coöperating with said primary pawls, means for limiting the movement of said secondary pawls, printing hammers having projections engaging said secondary pawls, said printing hammers also having locking shoulders, a bail-bar engaging said locking shoulders to restrain said printing hammers against movement, and a vibrating bar for holding said secondary pawls against movement, and operating said bail-bar, said vibrating bar also carrying springs connected to said secondary pawls which are placed under increasing tension upon the movement of said vibrating bar to release said bail-bar.

62. In a calculating machine, the combination of a totalizer, actuating racks therefor, digit keys, key position stops for controlling the movement of said racks, a laterally movable carriage in which said stops are mounted, an escapement mechanism for said carriage, a repeat key, means operated by said repeat key for locking all of the digit keys against operation when a number has been set up in the carriage to be repeated, and a zero key which remains in operative control of said escapement mechanism when the repeat key is operated, to advance the carriage to higher orders in the operation of multiplication, whereby the digits in the number set up in the carriage may be repeatedly used as a multiplicand of increasing power.

63. In a calculating machine the combination of a totalizer, actuating racks therefor, printing mechanism, a repeat key, and means whereby when said repeat key is partially depressed said printing mechanism is operated, and when said repeat key is fully depressed said printing mechanism is rendered inoperative.

64. In a calculating machine the combination of a totalizer, actuating racks therefor, printing mechanism, an operating shaft, a link connected to said operating shaft for operating said printing mechanism, and a key for disconnecting said link from said shaft whereby the printing mechanism is rendered inoperative.

65. In a calculating machine the combination of a key having a plurality of notches, a pivoted lever coöperating with said notches to hold the key in different positions, and means for locking the key in a partially depressed position.

66. In a calculating machine the combination of a key having a plurality of notches, a spring-pressed element coöperating therewith to hold said key partly or fully depressed, a supplemental key, and a plunger coöperating with said supplemental key for arresting the first mentioned key in a partially depressed position.

67. In a calculating machine the combination of racks a rack-actuating frame, and a pivoted ribbon-guide vibrated by said frame.

68. In a calculating machine the combination of a rack-actuating frame, racks, printing type positioned by said racks, and a ribbon-guide which is vibrated by said frame whereby the ribbon is placed in the printing line at the time the printing impression is made.

69. In a calculating machine the combination of racks, a rack-actuating frame, printing type positioned by said racks, and a frame carrying ribbon spools and a ribbon-guide which is rocked by said rack-actuating frames.

70. In a calculating machine the combination of racks a rack-actuating frame, a rocking frame movable thereby, ribbon spools carried by said rocking frame, ratchet wheels mounted on said ribbon spools, and pawls for coöperating with said ratchet wheels to feed the ribbon when said frame is rocked.

71. In a calculating machine the combination of racks a rack-actuating frame, a rocking frame movable thereby, ribbon spools mounted on said rocking frame, ratchet wheels conjoined to said ribbon spools, displaceable pawls for coöperating with said ratchet wheels to effect the ribbon feed, and means for rendering one of said pawls ineffective.

72. In a calculating machine the combination of racks carrying printing type, a rack-actuating frame, a rocking frame carrying ribbon spools and a ribbon-guide, and which is vibrated by said actuating frame, means for feeding the ribbon when said frame is rocked, and means for rendering the printing impression made by said type immediately visible by the rocking of said frame.

73. In a calculating machine the combination of a totalizer, carrying mechanism, a total key, and connections for obtaining a total, and means for rendering the carrying mechanism inoperative during the total taking operations.

74. In a calculating machine the combination of a totalizer, carrying mechanism, means for restoring the carrying mechanism after operation, a total key and connections, and means disabling the restoring means for the carrying mechanism during total-taking operations.

In testimony whereof I hereunto affix my signature in the presence of two witnesses, this 4th day of February, 1911.

OTTO THIEME.

Witnesses:
 BLANCHE L. CROWLEY,
 ALMA GEBHART.